United States Patent [19]
Bethoux et al.

[11] Patent Number: 6,087,801
[45] Date of Patent: Jul. 11, 2000

[54] PROCESS FOR CONTROLLING A ROTATING MACHINE, A SERVOCONTROL SYSTEM FOR IMPLEMENTING SAID METHOD AND A ROTATING MACHINE PROVIDED WITH A SYSTEM OF THIS KIND

[75] Inventors: Olivier Bethoux, Paris; Serge Poullain, Ste-Geneviève-des-Bois; Jean-Luc Thomas, Thomery; Camal Ait Mahrez, Amilly; Guy Bornard, Biviers, all of France

[73] Assignee: Alcatel, Paris, France

[21] Appl. No.: 09/019,437

[22] Filed: Feb. 5, 1998

[30] Foreign Application Priority Data

Feb. 6, 1997 [FR] France ................................. 97 01346

[51] Int. Cl.$^7$ ....................................... H02P 7/64
[52] U.S. Cl. ...................... 318/801; 318/805; 318/807; 318/808; 318/568.1; 318/799; 364/474.3
[58] Field of Search ..................... 318/805, 807, 318/254, 799, 808, 568.1, 801; 364/474.3

[56] References Cited

U.S. PATENT DOCUMENTS

| | | | |
|---|---|---|---|
| 4,484,128 | 11/1984 | Jotten et al. | 318/805 |
| 4,678,248 | 7/1987 | Depenbrock | 318/805 |
| 4,926,105 | 5/1990 | Mischenko et al. | 318/800 |
| 4,959,573 | 9/1990 | Roberts | 310/68 R |
| 5,131,507 | 7/1992 | Watanabe | 187/110 |
| 5,334,923 | 8/1994 | Lorenz et al. | 318/805 |
| 5,565,752 | 10/1996 | Jansen et al. | 318/807 |
| 5,585,709 | 12/1996 | Jansen et al. | 318/807 |
| 5,610,485 | 3/1997 | Depenbrock et al. | 318/432 |
| 5,629,598 | 5/1997 | Wilkerson | 318/808 |
| 5,644,206 | 7/1997 | Yura | 318/807 |
| 5,648,705 | 7/1997 | Sitar et al. | 318/145 |

OTHER PUBLICATIONS

P. Thogersen et al, Stator flux oriented asyncnhronous vector modulation for AC–drives, PESC'90 Record, 21st Annual IEEE Power Electronics Specialists Conference, vol. 2, 1990, San Annew York, USA, pp. 641–648.

F. Hoffman et al, "Fast Torque Control of an IGBT–Inverter–Fed Three–Phase A.C. Drive in the Whole Speed Range Experimental Results", Sep. 19, 1995, EPE '95: 6th European Conference on Power Electronics and Applications Sevilla, Sep. 19–21, 1995, vol. 3, pp. 3.399–3.404, European Power Electronics and Drives Association.

J. Holtz et al, "Optimal Pulsewidth Modulation for AC Servos and Low–Cost Industrial Drives", Jul. 1994, IEEE Transactions on Industry Applications, vol. 30, Nr. 4, pp. 1039–1047.

*Primary Examiner*—Robert E. Nappi
*Assistant Examiner*—Ritor Leykin
*Attorney, Agent, or Firm*—Sughrue, Mion, Zinn, Macpeak & Seas, PLLC

[57] ABSTRACT

In a process for controlling a rotating machine having n phases powered by a voltage inverter defining $m^n$ states of the stator phase voltage vector the electromagnetic torque $\Gamma$ and the stator flux $|\phi_s|$ of the machine are servocontrolled. A calculator calculates a succession of n states of the phase voltage vector to move the torque $\Gamma$ and the flux $|\phi_s|$ towards the set points $\Gamma_{ref}$, $|\phi_s|_{ref}$. On each sampling, the calculator calculates the remaining application time of the current state and the updated application times of the future states of the phase vector. Asynchronously with the sampling times and the calculation times, the calculator sends SPmLL switch control signals to switch from the current state to the next state.

36 Claims, 4 Drawing Sheets

PROCESS FOR CONTROLLING A ROTATING MACHINE, A SERVOCONTROL SYSTEM FOR IMPLEMENTING SAID METHOD AND A ROTATING MACHINE PROVIDED WITH A SYSTEM OF THIS KIND

BACKGROUND OF THE INVENTION

1. Field of the Invention

The invention concerns a processor controlling a rotating machine, a servocontrol system for implementing said method and a rotating machine provided with a system of this kind.

To be more precise, the invention concerns a method of controlling the electromagnetic torque and the stator flux of an asynchronous rotating machine having a high dynamic range from low speeds to high speeds.

2. Description of the Prior Art

U.S. Pat. No. 4,678,248 concerns a control method in which the control parameters are the electromagnetic torque and the stator flux.

The method uses vector modeling of the machine and of the voltage inverter.

The electromagnetic torque of the machine is known to be a function of the angle between the rotor flux rotating vector and the stator flux rotating vector and the moduli of these flux vectors. In other words, the electromagnetic torque $\Gamma_{em}$ is a function of the vector product of the rotating flux vectors:

$$\Gamma_{em} = K\ (\phi_R \times \phi_s)$$

The stator voltage vector $V_s$ is delivered by a three-phase voltage inverter, each phase including a two-state SP2LL (Single Pole 2 Logic Levels) switch. Accordingly, the stator voltage vector $V_s$ can assume eight states $V_1 \ldots V_8$ ($2^3$), of which two $V_1$, $V_8$ are of null amplitude (null states) in the stator fixed frame of reference ($\alpha$, $\beta$), according to the combination of the three SP2LL switches of the inverter.

The DTC (Direct Torque Control) system relies on maintaining the modulus $|\phi_s|$ of the stator flux rotating vector $\phi_s$ in a hysteresis band H in the stator frame of reference ($\alpha$, $\beta$) and on controlling the torque $\Gamma_{em}$ by accelerating the stator flux rotating vector $\phi_s$ relative to the rotor flux $\phi_R$ to increase the torque $\Gamma_{em}$ (increase the angle between the two flux vectors) and by stopping the stator flux vector $\phi_s$ so that the rotor flux vector $\phi_R$ catches up with it to reduce the torque $\Gamma_{em}$ (reducing the angle between the two flux vectors).

The stator flux vector $\phi_s$ is controlled by means of a finite table. This table contains, for a given location $N_i$ (i=1 ... 6) of the stator flux vector $\phi_s$ rotating in the plane in the stator ($\alpha$, $\beta$), the states $V_1 \ldots V_8$ of the stator phase voltage vector $V_s$ which enable the stator flux vector to be stopped (null states $V_1$, $V_8$) and those for opening the angle between the flux vectors $\phi_s$, $\phi_R$ whilst maintaining the stator flux vector $\phi_s$ in the hysteresis band H.

In the case of low rotor rotation speeds, the response dynamic of the above solution is very poor. In particular, the negative step response time is in the order of four times the response time of a positive step of the same amplitude.

Furthermore, the proposed technique dedicates control of the stator flux (maintenance of the stator flux modulus in the hysteresis band) to torque control. Configurations in which stator flux control is required concomitantly with control of the torque $\Gamma_{em}$ are not provided for.

U.S. Pat. No. 5,610,485 concerns an asynchronous rotating machine control method using the DTC method for one range of speeds and adding hysteresis to the torque. Moreover, the method provides two additional modes of operation, one for low speeds and the other for high speeds.

The mode of operation at low speeds is based on the imposition of an inverter switching frequency.

The mode of operation at high speeds is the full wave mode.

One of the major disadvantages of the above methods results from the fact that switching from one phase vector state to another phase vector state is effected at sampling times when the control system registers overshooting of one of the hystereses. Accordingly, for the system to have a good dynamic (to prevent an excessive overshoot) it is necessary to use very short sampling periods ($T_{ech}$=50 $\mu$s; $f_{ech}$=20 kHz) leading to high sampling frequencies that are significantly higher than the sampling frequencies generally used in real time devices.

Furthermore, the problem of stator flux control (maintaining the stator flux modulus in the hysteresis band) dedicated to torque control has not be solved. Configurations in which stator flux control is required concomitantly with control of the torque $\Gamma_{em}$ are still not provided for.

Finally, the change to full wave mode is not simple to effect.

One aim of the present invention is to propose a method of controlling the electromagnetic torque and the stator flux of an asynchronous rotating machine in which the inverter switching times are predicted by calculation and carried out asynchronously with the sampling or calculation times. In this way the sampling frequencies no longer need to be as high as in the prior art and are reduced to the frequencies used as standard in prior art real time devices (between 2 kHz and 5 kHz).

Another aim of the present invention is to propose a method of controlling the electromagnetic torque and the stator flux of an asynchronous rotating machine in which the electromagnetic torque and the stator flux can be regulated concomitantly.

Another aim of the present invention is to propose a method of controlling the electromagnetic torque and the stator flux of an asynchronous rotating machine in which the change to full wave mode does not require any change of strategy.

SUMMARY OF THE INVENTION

To this end the invention concerns a process for controlling a rotating machine with n phases supplied with alternating current by a voltage inverter comprising n SPmLL switches defining $m^n$ states of the stator phase voltage vector, the electromagnetic torque $\Gamma$ and the stator flux $|\phi_s|$ of said machine being slaved to set points $\Gamma_{ref}$, $|\phi_s|_{ref}$ by a servocontrol system that can employ various control strategies, each strategy having application conditions, said servocontrol system including a set of sensors the values sensed by which are transmitted to an observer-sampler, the outputs of the observer, sampled at a given sampling period $T_e$, being fed into a calculator, said calculator outputting control signals for the SPmLL switches of the voltage inverter.

In this process, and in accordance with the application conditions of the control strategy employed, the calculator calculates a succession of n states of the phase voltage vector to move the torque $\Gamma$ and the flux $|\phi_s|$ towards the set points $\Gamma_{ref}$, $|\phi_s|_{ref}$ by successively switching n states of the succession and the application time $dt_k$, $k \in \{1, \ldots, n\}$ of each of said n states of the succession, on each sampling, the calculator calculates the remaining application time of the current state and the updated application times of the future states of the phase vector, and asynchronously with the sampling times and the calculation times, at the end of the application time of the current state, the calculator sends SPmLL switch control signals to switch from the current state to the next state.

In one mode of operation, the calculator performing the calculations in an orthogonal three-dimensional calculation frame of reference comprising the stator plane ($\phi_{s\alpha}$, $\phi_{s\beta}$) of the stator flux $\phi_s$ and an axis perpendicular to said stator plane ($\phi_{s\alpha}$, $\phi_{s\beta}$) representing the torque $\Gamma$, the set points $\Gamma_{ref}$, $|\phi_s|_{ref}$ being represented by a circle $\eta_{ref}$ contained in a plane parallel to the stator plane ($\phi_{s\alpha}$, $\phi_{s\beta}$), centered on said perpendicular axis, having a radius $|\phi_s|_{ref}$ and intercepting said perpendicular axis at $\Gamma_{ref}$, the values $\Gamma$, $\phi_s$ supplied by the rotating machine being represented by a point A ($\phi_{s\alpha}$, $\phi_{s\beta}$, $\Gamma$) on a circle $\eta$ contained in a plane parallel to the stator plane ($\phi_{s\alpha}$, $\phi_{s\beta}$), centered on said perpendicular axis, having a radius $|\phi_s|$ and intercepting said perpendicular axis at $\Gamma$, the control strategy is a strategy asynchronous with the rotation frequency of the rotating machine in which the succession of n states of the voltage vector is calculated so that the point A ($\phi_{s\alpha}$, $\phi_{s\beta}$, $\Gamma$) converges to any point D of a circle $\eta_{cal}$, centered on said perpendicular axis, having a radius $|\phi_s|_{cal}$ and intercepting said perpendicular axis at $\Gamma_{cal}$ by successive application of the n states, in a predetermined given time, said calculator calculating the equation of the circle $\eta_{cal}$ so that the application time of the succession, the mean torque $\Gamma$ and the mean stator flux $|\phi_s|$ generated are respectively substantially equal to the set points $\Gamma_{ref}$, $|\phi_s|_{ref}$.

In particular, n being equal to three, the control strategy is based on the application of a SOCMLI cycle such that the calculator looks for a unique triplet of states ($V_0$, $V_i$, $V_{adj}$) i∈{2 . . . m"−1} of the voltage vector constituting a succession of three states comprising an initial state $V_i$, one of the two states $V_{adj}$ adjacent to $V_i$ and a null state ($V_0$), the respective application times $dt_i$, $dt_{adj}$, $dt_0$ of which are positive and such that their sum is equal to half the switching period $T_d$ of the inverter.

Accordingly, the process steps are:

a) the calculator looks for the unique triplet ($V_0$, $V_i$, $V_{adj}$) i∈{2 . . . m"−1} and calculates the presumed arrival point D' on the circle $\eta_{cal}$, b) it sends the SPmLL switch control signals to switch to the state $V_i$, c) on each sampling, the calculator calculates for the current point A' ($\phi_{s\alpha c}$, $\phi_{s\beta c}$, $\Gamma_c$) the remaining time $dt_{ir}$ of application of the state $V_i$ and the updated times $dt_{adj}$ and $dt_0$ of the future states $V_{adj}$ and $V_0$, d) if $dt_{ir} \leq T_e$ the calculator predicts the switching time from the state $V_i$ to the state $V_{adj}$, e) asynchronously with the sampling times and the calculation times, when the switching time arrives, the calculator sends the SPmLL switch control signals to switch to the state $V_{adj}$, f) on each sampling, the calculator calculates for the current point B' ($\phi_{s\alpha c}$, $\phi_{s\beta c}$, $\Gamma_c$) the remaining time $dt_{adjr}$ of application of the state $V_{adj}$ and the updated time $dt_0$ of the future state $V_0$, g) if $dt_{adjr} \leq T_e$ the calculator predicts the switching time from the state $V_{adj}$ to the state $V_0$, h) asynchronously with the sampling times and the calculation times, when the switching time arrives, the calculator sends the SPmLL switch control signals to switch to the state $V_0$, i) on each sampling, the calculator calculates for the current point C' ($\phi_{s\alpha c}$, $\phi_{s\beta c}$, $\Gamma_c$) the remaining time $dt_{0r}$ of application of the state $V_0$, j) if $dt_{0r} \leq T_e$, the calculator looks for a new unique triplet ($V'_0$, $V'_i$, $V'_{adj}$) i∈{2 . . . m"−1} and predicts the switching time from the state $V_0$ to the state $V'_i$, k) asynchronously with the sampling times and the calculation times, when the switching time arrives, the calculator sends the SPmLL control signals to switch to the state $V'_i$, the calculator processing the new triplet ($V'_0$, $V'_i$, $V'_{adj}$) by applying steps c) through k).

In step c) the calculator solves the following system:

$$\begin{vmatrix} \overset{\circ}{\phi_{S\alpha}}(V_i) & \overset{\circ}{\phi_{S\alpha}}(V_{adj}) & \overset{\circ}{\phi_{S\alpha}}(V_0) & \phi_{S\beta}(D') \\ \overset{\circ}{\phi_{S\beta}}(V_i) & \overset{\circ}{\phi_{S\beta}}(V_{adj}) & \overset{\circ}{\phi_{S\beta}}(V_0) & -\phi_{S\alpha}(D') \\ \overset{\circ}{\Gamma}(V_i) & \overset{\circ}{\Gamma}(V_{adj}) & \overset{\circ}{\Gamma}(V_0) & 0 \\ 1 & 1 & 1 & 0 \end{vmatrix} \begin{vmatrix} dt_{ir} \\ dt_{adj} \\ dt_0 \\ \lambda \end{vmatrix} = \begin{vmatrix} \phi_{S\alpha}(D) - \phi_{S\alpha}(A') \\ \phi_{S\beta}(D) - \phi_{S\beta}(A') \\ \Gamma(D) - \Gamma(A') \\ \tfrac{1}{2}T_d - t_c \end{vmatrix}$$

where $\lambda$ is a parameter defining the position of the point D on a tangent to the circle $\eta_{cal}$ at D'.

In step f) the calculator solves the following system using the least squares method:

$$\begin{vmatrix} \overset{\circ}{\phi_{S\alpha}}(V_{adj}) & \overset{\circ}{\phi_{S\alpha}}(V_0) & \phi_{S\beta}(D') \\ \overset{\circ}{\phi_{S\beta}}(V_{adj}) & \overset{\circ}{\phi_{S\beta}}(V_0) & -\phi_{S\alpha}(D') \\ \overset{\circ}{\Gamma}(V_{adj}) & \overset{\circ}{\Gamma}(V_0) & 0 \\ 1 & 1 & 0 \end{vmatrix} \begin{vmatrix} dt_{adjr} \\ dt_0 \\ \lambda \end{vmatrix} = \begin{vmatrix} \phi_{S\alpha}(D) - \phi_{S\alpha}(B') \\ \phi_{S\beta}(D) - \phi_{S\beta}(B') \\ \Gamma(D) - \Gamma(B') \\ \tfrac{1}{2}T_d - t_c \end{vmatrix}$$

In step i) the calculator calculates for the current point C' ($\phi_{s\alpha c}$, $\phi_{s\beta c}$, $\Gamma_c$) the remaining time $dt_{0r}$ of application of the state $V_0$ by using the least squares method to solve the following system:

$$\begin{vmatrix} \overset{\circ}{\Gamma}(V_0) \\ 1 \end{vmatrix} |dt_0| = \begin{vmatrix} \Gamma(D) - \Gamma(C') \\ \tfrac{1}{2}T_d - t_c \end{vmatrix}$$

In step d) the calculator predicts the switching from the state $V_i$ to the other state adjacent $V_i$ in order to re-align the trajectory of the point B' towards the circle $\eta_{cal}$.

If there is no unique triplet ($V_0$, $V_i$, $V_{adj}$) the calculator looks for a succession of two states ($V_i$, $V_{adj}$) other than a null state for the best approximation to the point A ($\phi_{s\alpha}$, $\phi_{s\beta}$, $\Gamma$) on the circle $\eta_{ref}$ in the time interval $\tfrac{1}{2}T_d$.

In another mode of operation, the calculator performing the calculations in an orthogonal three-dimensional calculation frame of reference comprising the stator plane ($\phi_{s\alpha}$, $\phi_{s\beta}$) of the stator flux $\phi_s$ and an axis perpendicular to said stator plane ($\phi_{s\alpha}$, $\phi_{s\beta}$) representing the torque $\Gamma$, the set points $\Gamma_{ref}$, $|\phi_s|_{ref}$ being represented by a circle $\eta_{ref}$ contained in a plane parallel to the stator plane ($\phi_{s\alpha}$, $\phi_{s\beta}$), centered on said perpendicular axis, having a radius $|\phi_s|_{ref}$ and intercepting said perpendicular axis at $\Gamma_{ref}$, the values $\Gamma$, $\phi_s$ supplied by the rotating machine being represented by a point A ($\phi_{s\alpha}$, $\phi_{s\beta}$, $\Gamma$) on a circle $\eta$ contained in a plane parallel to the stator plane ($\phi_{s\alpha}$, $\phi_{s\beta}$), centered on said perpendicular axis, having a radius $|\phi_s|$ and intercepting said perpendicular axis at $\Gamma$, the control strategy is a strategy synchronous with the rotation frequency of the rotating machine in which the succession of n states of the voltage vector is calculated so that the point A ($\phi_{s\alpha}$, $\phi_{s\beta}$, $\Gamma$) converges to a point D on a circle $\eta_{cal}$ centered on said perpendicular axis, having a radius $|\phi_s|_{cal}$ and intercepting said perpendicular axis at $\Gamma_{cal}$, by successive application of the n states, with a predetermined final position of the stator flux vector in the stator plane ($\phi_{s\alpha}$, $\phi_{s\beta}$), said calculator calculating the equation of the circle $\eta_{cal}$ so that the application time of the succession, the mean torque $\Gamma$ and the mean stator flux $|\phi_s|$ generated are respectively substantially equal to the set points $\Gamma_{ref}$, $|\phi_s|_{ref}$.

The number of predetermined positions authorized for each rotation of the stator flux is finite and dependent on a range of rotation speed of the rotating machine.

In particular, n being equal to three, the control strategy is such that the calculator knows a unique triplet of states ($V_0$, $V_i$, $V_{adj}$) i∈{2 ... $m^n-1$} of the voltage vector constituting a succession of three states, comprising an initial state $V_i$, one of the two states $V_{adj}$ adjacent to $V_i$ and a null state ($V_0$), the respective application times $dt_i$, $dt_{adj}$, $dt_0$ of which are positive, said triplet intercepting the circle $\eta_{cal}$ at a known point D.

Accordingly, in a rotary machine initialization step, triplets ($V_0$, $V_i$, $V_{adj}$) i∈{2 ... $m^n-1$} are stored in memory in the calculator for going from one predetermined position to another predetermined position of the stator flux vector, according to various rotating machine rotation speed ranges, and, in operation, a) the calculator knows the triplet ($V_0$, $V_i$, $V_{adj}$) to be applied according to the rotation speed of the rotating machine and the predetermined position at which the stator flux vector is located, b) it sends the SPmLL switch control signals to switch to state $V_i$, c) on each sampling, the calculator calculates for the current point A' ($\phi_{s\alpha c}$, $\phi_{s\beta c}$, $\Gamma_c$) the remaining time $dt_{ir}$ of application of the state $V_i$ and the updated times $dt_{adj}$ and $dt_0$ of the future states $V_{adj}$ and $V_0$, d) if $dt_{ir} \leq T_e$ the calculator predicts the time of switching from the state $V_i$ to the state $V_{adj}$, e) asynchronously with the sampling times and the calculation times, when the switching time arrives, the calculator sends the SPmLL switch control signals to switch to state $V_{adj}$, f) on each sampling the calculator calculates for the current point B' ($\phi_{s\alpha c}$, $\phi_{s\beta c}$, $\Gamma_c$) the remaining time $dt_{adjr}$ of application of the state $V_{adj}$ and the updated time $dt_0$ of the future state $V_0$, g) if $dt_{adjr} \leq T_e$ the calculator predicts the time of switching from the state $V_{adj}$ to the state $V_0$, h) asynchronously with the sampling times and the calculation times, when the switching time arrives the calculator sends the SPmLL switch control signals to switch to the state $V_0$, i) on each sampling the calculator calculates for the current point C' ($\phi_{s\alpha c}$, $\phi_{s\beta c}$, $\Gamma_c$) the remaining time $dt_{0r}$ of application of the state $V_0$, j) if $dt_{0r} \leq T_e$ the calculator predicts the time of switching from the state $V_0$ to the state $V'_i$ and additionally the calculator knows the new unique triple ($V'_0$, $V'_i$, $V'_{adj}$) for going from the predetermined position that is about to be reached to the next predetermined position of the stator flux vector, and k) asynchronously with the sampling times and the calculation times, when the switching time arrives the calculator sends the SPmLL switch control signals to switch to the state $V'_i$, the calculator processing the new triplet ($V'_0$, $V'_i$, $V'_{adj}$) in accordance with steps c) through k.

In step c) the calculator solves the following system:

$$\begin{vmatrix} \overset{\circ}{\phi}_{S\alpha}(V_i) & \overset{\circ}{\phi}_{S\alpha}(V_{adj}) & \overset{\circ}{\phi}_{S\alpha}(V_0) \\ \overset{\circ}{\phi}_{S\beta}(V_i) & \overset{\circ}{\phi}_{S\beta}(V_{adj}) & \overset{\circ}{\phi}_{S\beta}(V_0) \\ \overset{\circ}{\Gamma}(V_i) & \overset{\circ}{\Gamma}(V_{adj}) & \overset{\circ}{\Gamma}(V_0) \end{vmatrix} \begin{vmatrix} dt_{ir} \\ dt_{adj} \\ dt_0 \end{vmatrix} = \begin{vmatrix} \phi_{S\alpha}(D) - \phi_{S\alpha}(A') \\ \phi_{S\beta}(D) - \phi_{S\beta}(A') \\ \Gamma(D) - \Gamma(A') \end{vmatrix}$$

In step f) the calculator solves the following system:

$$\begin{vmatrix} \overset{\circ}{\phi}_{S\alpha}(V_{adj}) & \overset{\circ}{\phi}_{S\alpha}(V_0) & \phi_{S\beta}(D) \\ \overset{\circ}{\phi}_{S\beta}(V_{adj}) & \overset{\circ}{\phi}_{S\beta}(V_0) & -\phi_{S\alpha}(D) \\ \overset{\circ}{\Gamma}(V_{adj}) & \overset{\circ}{\Gamma}(V_0) & 0 \end{vmatrix} \begin{vmatrix} dt_{adjr} \\ dt_0 \\ \lambda \end{vmatrix} = \begin{vmatrix} -\phi_{S\alpha}(A') \\ -\phi_{S\beta}(B') \\ \Gamma(D) - \Gamma(B') \end{vmatrix}$$

where $\lambda$ is a parameter defining the predictable final position of the current point B' on a straight line in the stator plane passing through the torque $\Gamma$ axis and parallel to the predetermined position of the stator flux vector to be reached.

In step i) the calculator calculates for the current point C' ($\phi_{s\alpha c}$, $\phi_{s\beta c}$, $\Gamma_c$) the remaining time $dt_{0r}$ of application of the state $V_0$ by solving the following system:

$$\Gamma(D) = \Gamma(A) + [\Gamma_{ref} - \Gamma_{mean}]$$

$$dt_{0r} = \frac{\Gamma(D) - \Gamma(t_c)}{\overset{\circ}{\Gamma}(V_0)}$$

where $\Gamma_{mean}$ is the mean electromagnetic torque calculated over the time interval $dt_i + dt_{adj}$.

The change to full wave mode results from the fact that the time $dt_0$ of application of the null state is a decreasing function of the rotation speed of the rotating machine and equal to zero beyond a predetermined value of the rotation speed of the rotating machine.

The invention also consists in a servocontrol system for implementing the method described hereinabove.

The invention finally concerns a rotating machine provided with a servocontrol system of the above kind.

A first advantage of the present invention results from desynchronization of the switching times from the calculation times and the sampling times, which allows a significant increase in the sampling period and therefore application of the process with standard sampling devices.

Another advantage of the present invention results from the fact of the explicit presence of the concept of time which makes it possible to take into account in a reliable manner the switching frequency and minimum conduction time constraints inherent to power converters.

Another advantage of the present invention is an optimal torque dynamic even at low speeds.

Other advantages and features of the present invention will result from the following description with reference to the appended drawings.

DETAILED DESCRIPTION OF THE PREFERRED EMBODIMENT

Figure 1:
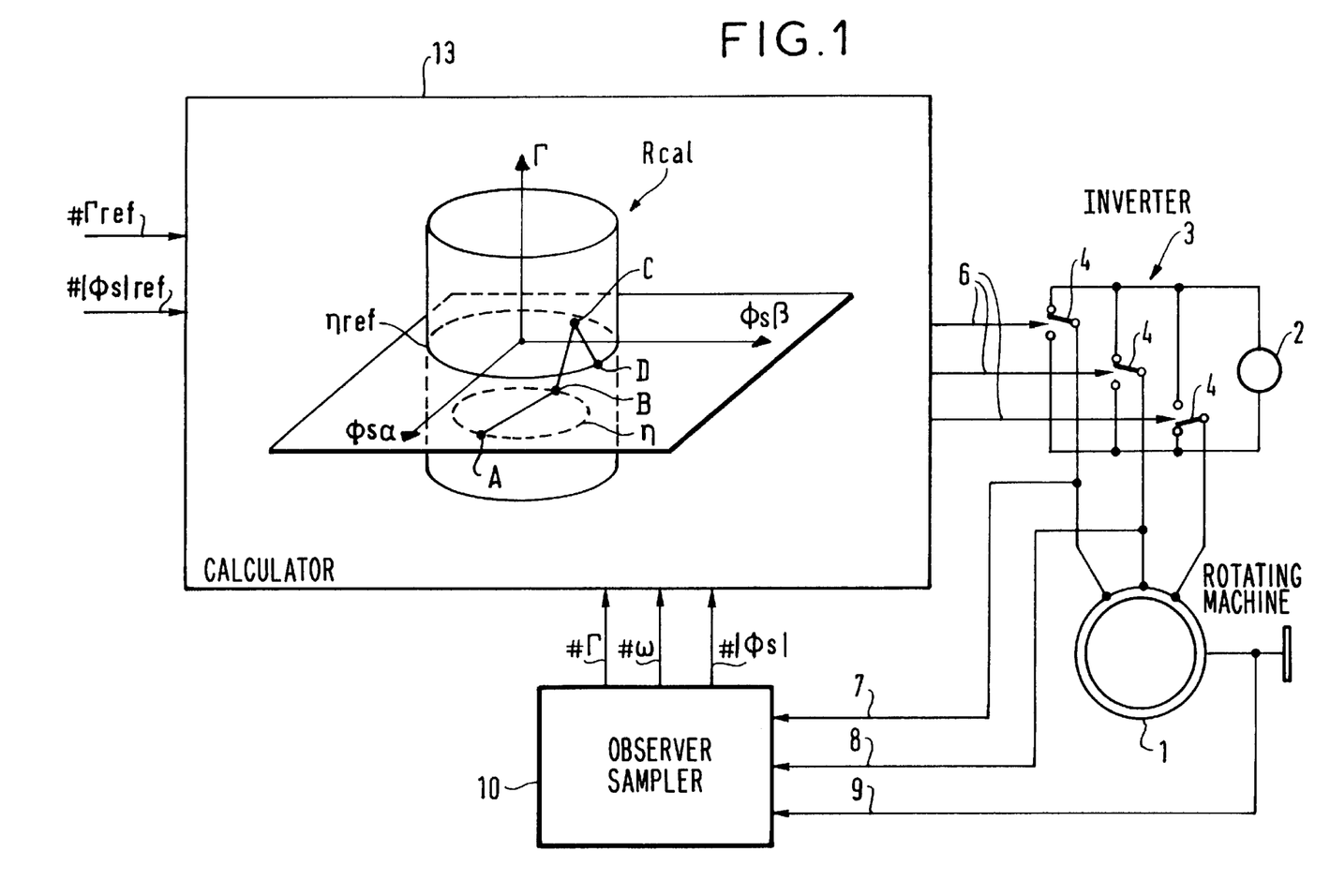
FIG. 1 is a schematic representation of a device in accordance with the invention.

The invention concerns a method of controlling a rotating machine 1 with n phases supplied with alternating current by a voltage inverter 3 comprising n (SPmLL: Single Pole m Logic Levels) switches 4 with m positions defining $m^n$ states $V_i$ i$\in\{1, \ldots, m^n\}$ of the stator voltage phase vector $V_s$.

The electromagnetic torque $\Gamma$ and the stator flux $|\phi_s|$ of the machine 1 are slaved to set points $\Gamma_{ref}$, $|\phi_s|_{ref}$ by a servo-control system 5 that can use various control strategies, each strategy having application conditions.

The servocontrol system 5 includes a set of sensors 7, 8, 9 the values sensed by which are transmitted to an observer-sampler 10.

The outputs of the observer 10, sampled at a given sampling period $T_e$, are fed into a calculator 13.

The calculator 13 outputs control signals 6 for the SPmLL switches 4 of the voltage inverter 3.

The outputs of the observer 10 are representative values of the torque $\Gamma$ and the stator flux $|\phi_s|$.

In addition to the sampled outputs, the calculator also receives as input the representative values of the set points $\Gamma_{ref}$ and $|\phi_s|_{ref}$.

The invention is more particularly concerned with the steps of the process that execute in the calculator 13.

In accordance with the application conditions of the control strategy employed, the calculator 13 calculates a succession of n states of the phase voltage vector $V_s$ to move the torque $\Gamma$ and the flux $|\phi_s|$ towards the set points $\Gamma_{ref}$, $|\phi_s|_{ref}$ by successively switching n states of the succession and the application time $dt_k$ k $\in \{1, \ldots, n\}$ of each of the n states of the succession.

On each sampling, the calculator calculates the remaining application time of the current state and the updated application times of the future states of the phase vector.

Asynchronously with the sampling and the calculation times, at the end of the application time of the current state, the calculator sends SPmLL switch 4 control signals to switch from the current state to the next state.

The process described hereinabove therefore enables the future switching times to be predicated by calculation and switching to be performed at the calculated times independently of the sampling times or the calculation times.

In the embodiment described, although this is not limiting on the invention, the calculator advantageously performs the calculations in an orthogonal three-dimensional calculation frame of reference comprising the stator plane ($\phi_{s\alpha}$, $\phi_{s\beta}$) of the stator flux $\phi_s$ and an axis perpendicular to the stator plane ($\phi_{s\alpha}$, $\phi_{s\beta}$) representing the torque $\Gamma$.

In this calculation space, the set points $\Gamma_{ref}$, $|\phi_s|_{ref}$ are represented by a circle $\eta_{ref}$ contained in a plane parallel to the stator plane ($\phi_{s\alpha}$, $\phi_{s\beta}$) centered on the perpendicular axis having a radius $|\phi_s|_{ref}$ and intercepting said perpendicular axis at $\Gamma_{ref}$.

Similarly, the current values $\Gamma$, $\phi_s$ supplied by the rotating machine are represented by a point A ($\phi_{s\alpha}$, $\phi_{s\beta}$, $\Gamma$) on a circle $\eta$ contained in a plane parallel to the stator plane ($\phi_{s\alpha}$, $\phi_{s\beta}$), centered on said perpendicular axis with a radius $|\phi_s|$ and intercepting said perpendicular axis at $\Gamma_c$.

Finally, the control strategies of the process are strategies in which the succession of n states of the voltage vector is calculated so that the point A ($\phi_{s\alpha}$, $\phi_{s\beta}$, $\Gamma$) converges to any point D on a circle $\eta_{cal}$ centered on said perpendicular axis having a radius $|\phi_s|_{cal}$ and intercepting said perpendicular axis at $\Gamma_{cal}$ by successive application of the n states.

To this end the calculator calculates the equation of the circle $\eta_{cal}$ so that for the duration of application of the succession of n states the mean torque $\Gamma$ and the mean stator flux $|\phi_s|$ generated are respectively substantially equal to the set points $\Gamma_{ref}$, $|\phi_s|_{ref}$.

In the embodiment described, in order to simplify the illustration of the process, the rotating machine is a three-phase machine and the inverter includes SP2LL switches. The process can nevertheless be applied to a machine with n phases and SPmLL switches.

Thus in the embodiment described there are eight possible states ($V_1, \ldots, V_8$) of the phase vector $V_s$, two of which are of zero amplitude ($V_1$, $V_8$). The process therefore applies a triplet of states to move towards the set points.

Provided that it exists, the process preferably applies a triplet ($V_0$, $V_i$, $V_{adj}$) i$\in\{2 \ldots m^n-1\}$ made up of a succession of three states comprising an initial state $V_i$, one of the two states $V_{adj}$ adjacent to $V_i$ and a null state $V_0$.

The process must therefore define the respective application times $dt_i$, $dt_{adj}$, $dt_0$ of the triplet. Adjustment of these three durations authorizes three degrees of freedom. Control such that at the end of application of the triplet the torque and the stator flux must be on $\eta_{cal}$ constrains only two degrees of freedom. An additional constraint must therefore be applied in order to be able to determine the three application times.

The process of the invention proposes two additional constraints each determining a different control strategy:
- A asynchronous control strategy whereby the additional constraint is a constraint of time to be respected at the end of application of the triplet, independent of the position of the stator flux rotating vector.
- A synchronous control strategy whereby the additional constraint is a constraint imposing a position of the stator flux rotating vector at the end of application of the triplet independently of the time elapsed for application of the triplet.

Figure 2:
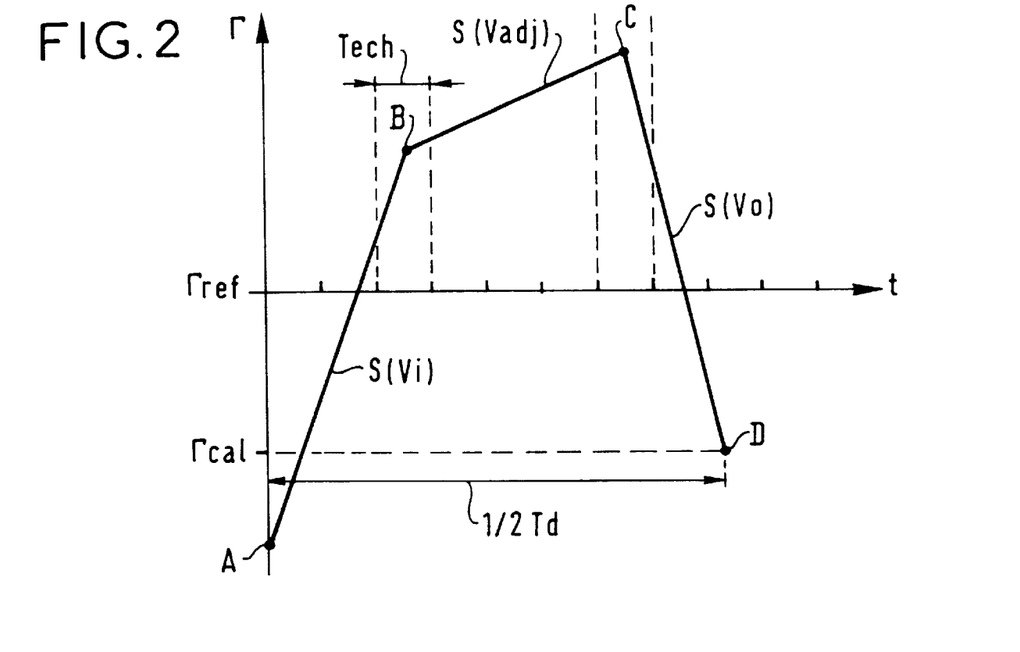
FIGS. 2 and 3 are schematic illustrations of a calculation example in the asynchronous mode of the invention.
Figure 3:
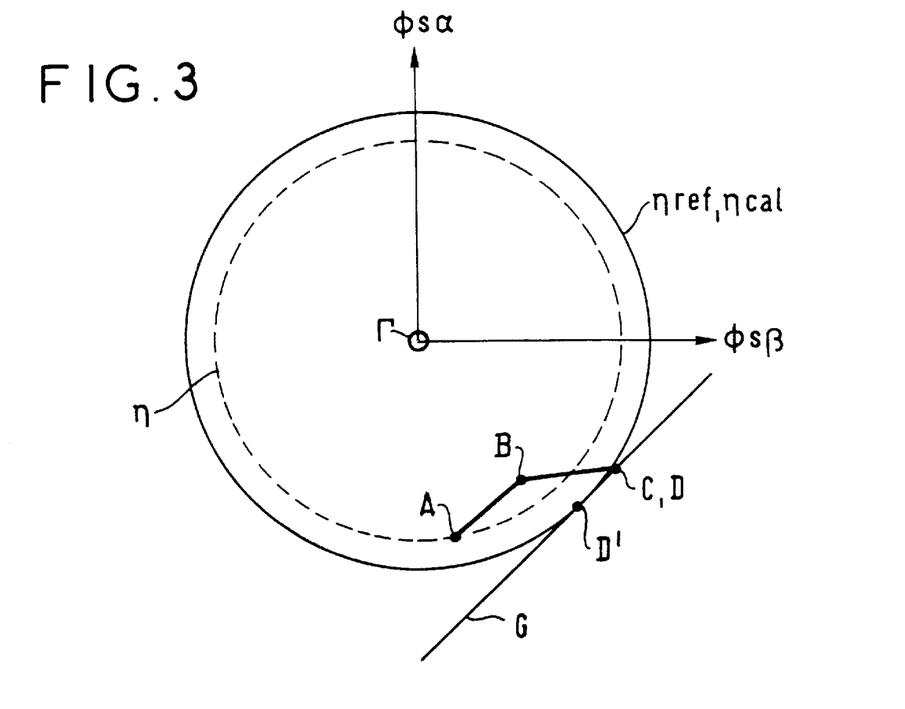

In the asynchronous strategy (FIGS. 2, 3):
the control strategy is based on application of a cycle such that the calculator looks for a unique triplet of states ($V_0$, $V_i$, $V_{adj}$) i$\in\{2 \ldots m^n-1\}$ of the voltage vector constituting a succession of three states comprising an initial state $V_i$, one of the two states $V_{adj}$ adjacent to $V_i$ and a null state $V_0$, the respective application times of which $dt_i$, $dt_{adj}$, $dt_0$ are positive and such that their sum is equal to half the switching period $T_d$ of the inverter:

$$dt_i + dt_{adj} + dt_0 = \tfrac{1}{2} T_d$$

The uniqueness of the triplet does not imply that it exists. If the calculator cannot find a triplet having three positive application times, the process launches a third control strategy known as the large transients strategy described below.

In the asynchronous control strategy:
a) the calculator looks for the unique triplet ($V_0$, $V_i$, $V_{adj}$) i$\in\{2 \ldots m^n-1\}$ and calculates the presumed arrival point D' on the circle $\eta_{cal}$,
b) it sends the SPmLL switch control signals to switch to the state $V_i$,
c) on each sampling, the calculator calculates for the current point A' ($\phi_{s\alpha c}$, $\phi_{s\beta c}$, $\Gamma_c$) the remaining time $dt_{ir}$ of application of the state $V_i$ and the updated times $dt_{adj}$ and $dt_0$ of the future states $V_{adj}$ and $V_0$, d) if $dt_{ir} \leq T_e$ the calculator predicts the switching time from the state $V_i$ to the state $V_{adj}$, e) asynchronously with the sampling times and the calculation times, when the switching time arrives, the calculator sends the SPmLL switch control signals to switch to the state $V_{adj}$, f) on each sampling, the calculator calculates for the current point B' ($\phi_{s\alpha c}$, $\phi_{s\beta c}$, $\Gamma_c$) the remaining time $dt_{adj}$ of application of the state $V_{adj}$ and the updated time $dt_0$ of the future state $V_0$, g) if $dt_{adjr} \leq T_e$ the calculator predicts the switching time from the state $V_{adj}$ to the state $V_0$, h) asynchronously with the sampling times and the calculation times, when the switching time arrives, the calculator sends the SPmLL switch control signals to switch to the state $V_0$, i) on each sampling, the calculator calculates for the current point C' ($\phi_{s\alpha c}$, $\phi_{s\beta c}$, $\Gamma_c$) the remaining time $dt_{0r}$ of application of the state $V_0$, j) if $dt_{0r} \leq T_e$, the calculator looks for a new unique triplet ($V'_0$, $V'_i$, $V'_{adj}$) i∈{2 . . . m''−1} and predicts the switching time from the state $V_0$ to the state $V'_i$, k) asynchronously with the sampling times and the calculation times, when the switching time arrives, the calculator sends the SPmLL control signals to switch to the state $V'_i$, the calculator processing the new triplet ($V'_0$, $V'_i$, $V'_{adj}$) by applying steps c) through k).

In one example of calculation by the process of the invention (FIGS. 2, 3), the state $V_i$ is applied to the segment AB. At each sampling time (step c)) the calculator calculates the application times for the current point A' by solving the following system of three equations in three unknowns:

$$\begin{cases} dt_i + dt_{adj} + dt_0 = \tfrac{1}{2}T_d - t_c \\ \Gamma(t_f = \tfrac{1}{2}T_d) = \Gamma_{ref} \\ \phi_s^2(t_f = \tfrac{1}{2}T_d) = \phi_{s\,ref}^2 \end{cases}$$

The above system of three equations in three unknowns is linearized by replacing the presumed point of arrival D' with a plane G tangential at D' to the circle $\eta_{cal}$.

The above system when linearized amounts to solving the following system:

$$\begin{vmatrix} \overset{\circ}{\phi}_{S\alpha}(V_i) & \overset{\circ}{\phi}_{S\alpha}(V_{adj}) & \overset{\circ}{\phi}_{S\alpha}(V_0) & \phi_{S\beta}(D') \\ \overset{\circ}{\phi}_{S\beta}(V_i) & \overset{\circ}{\phi}_{S\beta}(V_{adj}) & \overset{\circ}{\phi}_{S\beta}(V_0) & -\phi_{S\alpha}(D') \\ \overset{\circ}{\Gamma}(V_i) & \overset{\circ}{\Gamma}(V_{adj}) & \overset{\circ}{\Gamma}(V_0) & 0 \\ 1 & 1 & 1 & 0 \end{vmatrix} \begin{vmatrix} dt_{ir} \\ dt_{adj} \\ dt_0 \\ \lambda \end{vmatrix} = \quad \text{(SA1)}$$

$$\begin{vmatrix} \phi_{S\alpha}(D) - \phi_{S\alpha}(A') \\ \phi_{S\beta}(D) - \phi_{S\beta}(A') \\ \Gamma(D) - \Gamma(A') \\ \tfrac{1}{2}T_d - t_c \end{vmatrix}$$

where $\lambda$ is a parameter defining the position of the point D on a tangent to the circle $\eta_{cal}$ at D' such that $$\begin{vmatrix} \phi_{S\alpha}(D) \\ \phi_{S\beta}(D) \\ \Gamma(D) \end{vmatrix} = \begin{vmatrix} \phi_{S\alpha}(D') \\ \phi_{S\beta}(D') \\ \Gamma(D') \end{vmatrix} + \lambda \begin{vmatrix} -\phi_{S\beta}(D') \\ \phi_{S\alpha}(D') \\ 0 \end{vmatrix}$$

where D is not imposed
and where $$\overset{\circ}{S} = \begin{vmatrix} \overset{\circ}{\phi}_{S\alpha}(V_{index}) \\ \overset{\circ}{\phi}_{S\beta}(V_{index}) \\ \overset{\circ}{\Gamma}(V_{index}) \end{vmatrix} \text{ is the directional derivative of } S = \begin{vmatrix} \phi_{S\alpha}(V_{index}) \\ \phi_{S\beta}(V_{index}) \\ \Gamma(V_{index}) \end{vmatrix}$$

according to the state $V_{index}$ of the stator phase vector $V_s$.

The reader will understand that in order to calculate the directional derivatives the model of the rotating machine must have been input to the calculator beforehand.

(SA1) therefore supplies the three application times $dt_{ir}$, $dt_{adj}$, $dt_0$ at each sampling time on the segment AB.

When $V_{adj}$ is applied (segment BC), the loss of the degree of freedom tied to $V_i$ causes the process to reduce its ambitions as to the accuracy at the end of the triplet. Solving the system (SA1) with $dt_i=0$ does not provide an exact solution. The calculator adopts an approximate solution that minimizes the error. The calculator uses the least squares method, for example.

The calculator uses the least squares method to solve the following system (step f)):

$$\begin{vmatrix} \overset{\circ}{\phi}_{S\alpha}(V_{adj}) & \overset{\circ}{\phi}_{S\alpha}(V_0) & \phi_{S\beta}(D') \\ \overset{\circ}{\phi}_{S\beta}(V_{adj}) & \overset{\circ}{\phi}_{S\beta}(V_0) & -\phi_{S\alpha}(D') \\ \overset{\circ}{\Gamma}(V_{adj}) & \overset{\circ}{\Gamma}(V_0) & 0 \\ 1 & 1 & 0 \end{vmatrix} \begin{vmatrix} dt_{adjr} \\ dt_0 \\ \lambda \end{vmatrix} = \begin{vmatrix} \phi_{S\alpha}(D) - \phi_{S\alpha}(B') \\ \phi_{S\beta}(D) - \phi_{S\beta}(B') \\ \Gamma(D) - \Gamma(B') \\ \tfrac{1}{2}T_d - t_c \end{vmatrix} \quad \text{(SA2)}$$

(SA2) supplies the application times $dt_{adjr}$ and $dt_0$.

When $V_0$ is applied (segment CD) the loss of the degree of freedom tied to Vadj causes the process to reduce its ambitions as to the accuracy at the end of the triplet.

At the end of application of the triplet there will therefore be a double inaccuracy (triplet application time and torque value at the end of the triplet). Solving the system (SA2) with $dt_{adj}=0$ does not provide an exact solution. The calculator adopts an approximate solution that minimizes the error. The calculator uses the least squares method, for example.

The calculator uses the least squares method to solve the following system (step i)):
solving the following system by the least squares method:

$$\begin{vmatrix} \overset{\circ}{\Gamma}(V_0) \\ 1 \end{vmatrix} |dt_{0r}| = \begin{vmatrix} \Gamma(D) - \Gamma(C') \\ \tfrac{1}{2}T_d - t_c \end{vmatrix} \quad \text{(SA3)}$$

(SA3) calculates $dt_{0r}$.

In step d) the calculator can predict switching from state $V_i$ to the other state adjacent $V_i$ in order to realign the trajectory of the point B' towards the circle $\eta_{ref}$. This can be necessary if the set points are significantly modified during $dt_i$. Accordingly, the calculator can decide that application of the other state adjacent $V_i$ is no longer optimal. The other state adjacent $V_i$ will then be applied during the predicted time $dt_{adj}$.

In the FIG. 3 representation the circles $\eta_{cal}$, $\eta_{ref}$ have the same radius. The calculator could determine circles having different radii, however.

If there is no unique triplet ($V_0$, $V_i$, $V_{adj}$) with positive $dt_i$, $dt_{adj}$, $dt_0$, then the calculator switches to the "large transients" control strategy.

The calculator looks for a succession of two states ($V_i$, $V_{adj}$) different from a null state leading to an optimum approximation of the point A ($\phi_{s\alpha}$, $\phi_{s\beta}$, $\Gamma$) on the circle $\eta_{ref}$ in the time period $\tfrac{1}{2}T_d$.

To give just one example, the calculator could look for the pair of adjacent states minimizing the error:

$$\epsilon = \chi \cdot \epsilon_\phi + (1-\chi) \cdot \epsilon_\Gamma$$

This error allows weighted treatment of stator flux and torque errors.

Moreover, the constraint $dt_i + dt_{adj} = \tfrac{1}{2}T_d$ guarantees reasonable ripple on the parameters characteristic of the process.

In the case of the synchronous strategy (FIGS. 4, 5): the succession of n states of the voltage vector is calculated so that the point A ($\phi_{s\alpha}$, $\phi_{s\beta}$, $\Gamma$) converges to a point D on the circle $\eta_{cal}$ by successive application of the n states and with a predetermined position of the stator flux vector in the stator plane ($\phi_{s\alpha}$, $\phi_{s\beta}$).

The number of predetermined positions authorized per rotation of the flux vector is finite and depends on a range of rotation speeds of the rotating machine.

In the case of a three-phase rotating machine and an inverter using SP2LL switches, the control strategy is such that the calculator knows a unique triplet of states ($V_0$, $V_i$, $V_{adj}$) i∈{2 ... $m^n$-1} of the voltage vector constituting a succession of three states, comprising an initial state $V_i$, one of the two states $V_{adj}$ adjacent $V_i$ and a null state ($V_0$), the respective application times of which $dt_i$, $dt_{adj}$, $dt_0$ are positive, the triplet intercepting the circle $\eta_{cal}$ at a required point D.

In this process:

in a rotary machine initialization step, triplets ($V_0$, $V_i$, $V_{adj}$) i∈{2 ... $m^n$-1} are stored in memory in the calculator for going from a predetermined position to another predetermined position of the stator flux vector, according to various rotating machine rotation speed ranges, and in operation, a) the calculator knows the triplet ($V_0$, $V_i$, $V_{adj}$) to be applied according to the rotation speed of the rotating machine and the predetermined position at which the stator flux vector is located, b) it sends the SPmLL switch control signals to switch to the state $V_i$, c) on each sampling, the calculator calculates for the current point A' ($\phi_{s\alpha c}$, $\phi_{s\beta c}$, $\Gamma_c$) the remaining time $dt_{ir}$ of application of the state $V_i$ and the updated times $dt_{adj}$ and $dt_0$ of the future states $V_{adj}$ and $V_0$, d) if $dt_{ir} \leq T_e$ the calculator predicts the time of switching from the state $V_i$ to the state $V_{adj}$, e) asynchronously with the sampling times and the calculation times, when the switching time arrives, the calculator sends the SPmLL switch control signals to switch to the state $V_{adj}$, f) on each sampling, the calculator calculates for the current point B' ($\phi_{s\alpha c}$, $\phi_{s\beta c}$, $\Gamma_c$) the remaining time $dt_{adjr}$ of application of the state $V_{adj}$ and the updated time $dt_0$ of the future state $V_0$, g) if $dt_{adjr} \leq T_e$ the calculator predicts the time of switching from the state $V_{adj}$ to the state $V_0$, h) asynchronously with the sampling times and the calculation times, when the switching time arrives, the calculator sends the SPmLL switch control signals to switch to the state $V_0$, i) on each sampling, the calculator calculates for the current point C' ($\phi_{s\alpha c}$, $\phi_{s\beta c}$, $\Gamma_c$) the remaining time $dt_{0r}$ of application of the state $V_0$, j) if $dt_{0r} \leq T_e$, the calculator predicts the time of switching from the state $V_0$ to the state $V'_i$ and additionally the calculator knows the new unique triple ($V'_0$, $V'_i$, $V'_{adj}$) for going from the predetermined position that is about to be reached to the next predetermined position of the stator flux vector, and k) asynchronously with the sampling times and the calculation times, when the switching time arrives, the calculator sends the SPmLL control signals to switch to the state $V'_i$, the calculator processing the new triplet ($V'_0$, $V'_i$, $V'_{adj}$) in accordance with steps c) through k).

Figure 4:
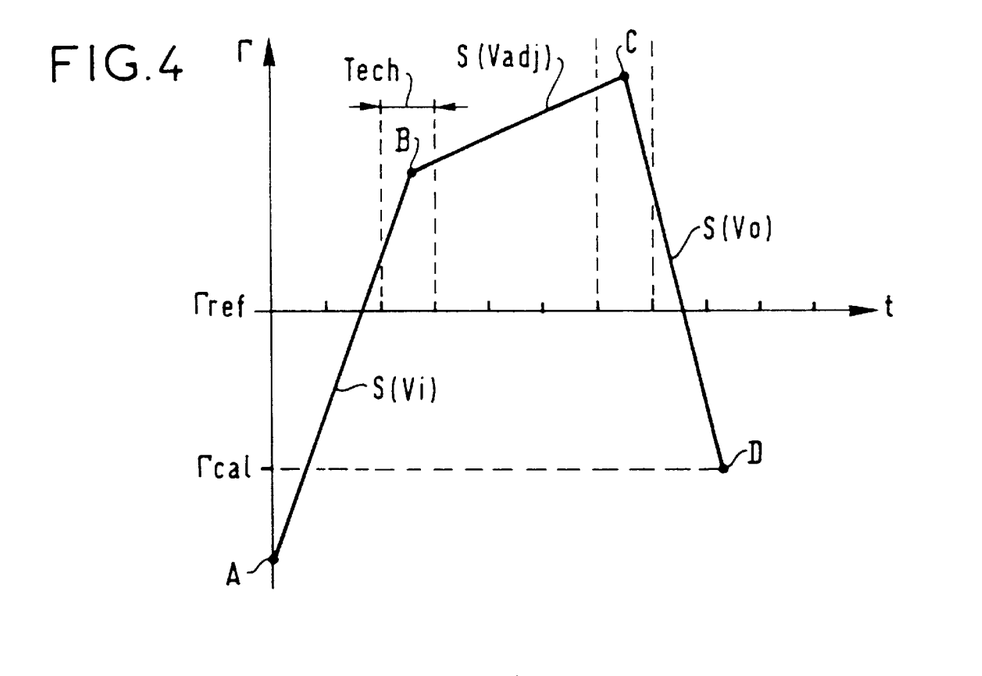
FIGS. 4 and 5 are schematic illustrations of a calculation example in the synchronous mode of the invention.
Figure 5:
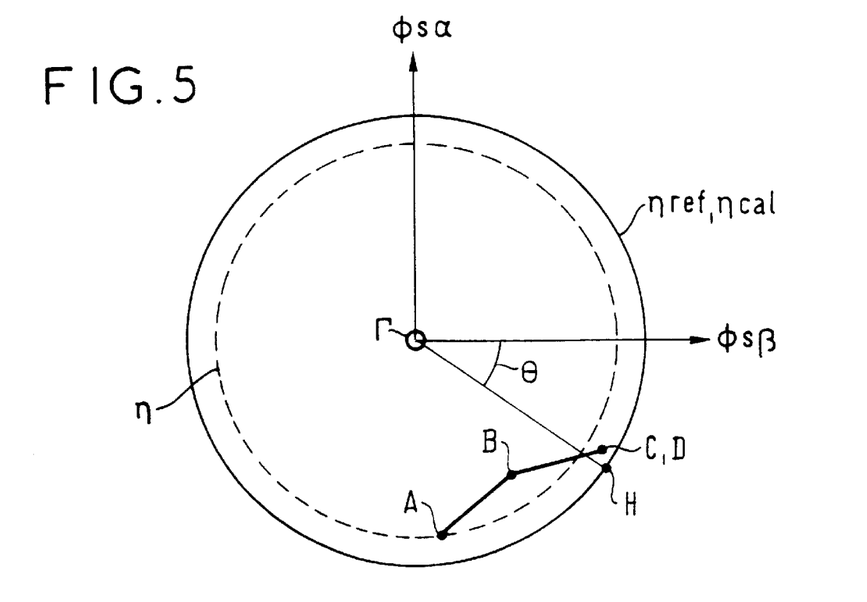

In one example of calculation in accordance with the invention (FIGS. 4, 5) the state $V_i$ is applied to the segment AB. The calculator calculates the application times for the current point A' at each sampling time by solving the following system $$\begin{vmatrix} \theta(t_f = \tfrac{1}{2}T_d) = \theta_f \\ \Gamma(t_f = \tfrac{1}{2}T_d) = \Gamma_{ref} \\ \phi_s^2(t_f = \tfrac{1}{2}T_d) = \phi_{sref}^2 \end{vmatrix}$$

where θ is the angle fixed to arrive at the imposed point D.

In step c), the calculator solves the following linear system:

$$\begin{vmatrix} \overset{\circ}{\phi}_{S\alpha}(V_i) & \overset{\circ}{\phi}_{S\alpha}(V_{adj}) & \overset{\circ}{\phi}_{S\alpha}(V_0) \\ \overset{\circ}{\phi}_{S\beta}(V_i) & \overset{\circ}{\phi}_{S\beta}(V_{adj}) & \overset{\circ}{\phi}_{S\beta}(V_0) \\ \overset{\circ}{\Gamma}(V_i) & \overset{\circ}{\Gamma}(V_{adj}) & \overset{\circ}{\Gamma}(V_0) \end{vmatrix} \begin{vmatrix} dt_{ir} \\ dt_{adj} \\ dt_0 \end{vmatrix} = \begin{vmatrix} \phi_{S\alpha}(D) - \phi_{S\alpha}(A') \\ \phi_{S\beta}(D) - \phi_{S\beta}(A') \\ \Gamma(D) - \Gamma(A') \end{vmatrix} \quad (SS1)$$

where D is imposed.

(SS1) therefore supplies the three application times $dt_{ir}$, $dt_{adj}$, $dt_0$ for each sampling time on the segment AB.

When $V_{adj}$ is applied (segment BC), the loss of the degree of freedom tied to $V_i$ causes the process to reduce its ambitions as to the accuracy at the end of the triplet. The objective tied to the amplitude of the stator flux is abandoned. Accordingly, in step f), the calculator solves the following system:

$$\begin{vmatrix} \overset{\circ}{\phi}_{S\alpha}(V_{adj}) & \overset{\circ}{\phi}_{S\alpha}(V_0) & \phi_{S\beta}(D) \\ \overset{\circ}{\phi}_{S\beta}(V_{adj}) & \overset{\circ}{\phi}_{S\beta}(V_0) & -\phi_{S\alpha}(D) \\ \overset{\circ}{\Gamma}(V_{adj}) & \overset{\circ}{\Gamma}(V_0) & 0 \end{vmatrix} \begin{vmatrix} dt_{adjr} \\ dt_0 \\ \lambda \end{vmatrix} = \begin{vmatrix} -\phi_{S\alpha}(A') \\ -\phi_{S\beta}(B') \\ \Gamma(D) - \Gamma(B') \end{vmatrix} \quad (SS2)$$

where λ is a parameter defining the predictable final position of the current point B' on a straight line in the stator plane passing through the torque Γ axis and parallel to the predetermined position of the stator flux vector to be reached.

(SS2) therefore provides the two application times $dt_{adjr}$, $dt_0$ and the value of λ for each sampling time on the segment BC.

When $V_0$ is applied (segment CD), the loss of the degree of freedom tied to $V_{adj}$ causes the process to reduce its ambitions as to the accuracy at the end of the triplet. Only the torque objective is retained. It is carefully chosen because the mechanical speed is high. Accordingly, in step i), the calculator calculates the remaining time $dt_{0r}$ for application of the state $V_0$ for the current point C' ($\phi_{s\alpha c}$, $\phi_{s\beta c}$, $\Gamma_c$) by solving the following system:

$$\Gamma(D) = \Gamma(A) + [\Gamma_{ref} - \Gamma_{mean}]$$

$$dt_{0r} = \frac{\Gamma(D) - \Gamma(t_c)}{\overset{\circ}{\Gamma}(V_0)}$$

where $\Gamma_{mean}$ is the mean electromagnetic torque calculated over the time interval $dt_i + dt_{adj}$.

In the FIG. 5 representation, the circles $\eta_{cal}$, $\eta_{ref}$ have the same radius. The calculator could nevertheless determine circles having different radii.

The null state application time $dt_0$ is a decreasing function of the rotating machine rotation speed and is equal to zero beyond a predetermined value of the rotating machine rotation speed.

Figure 6:
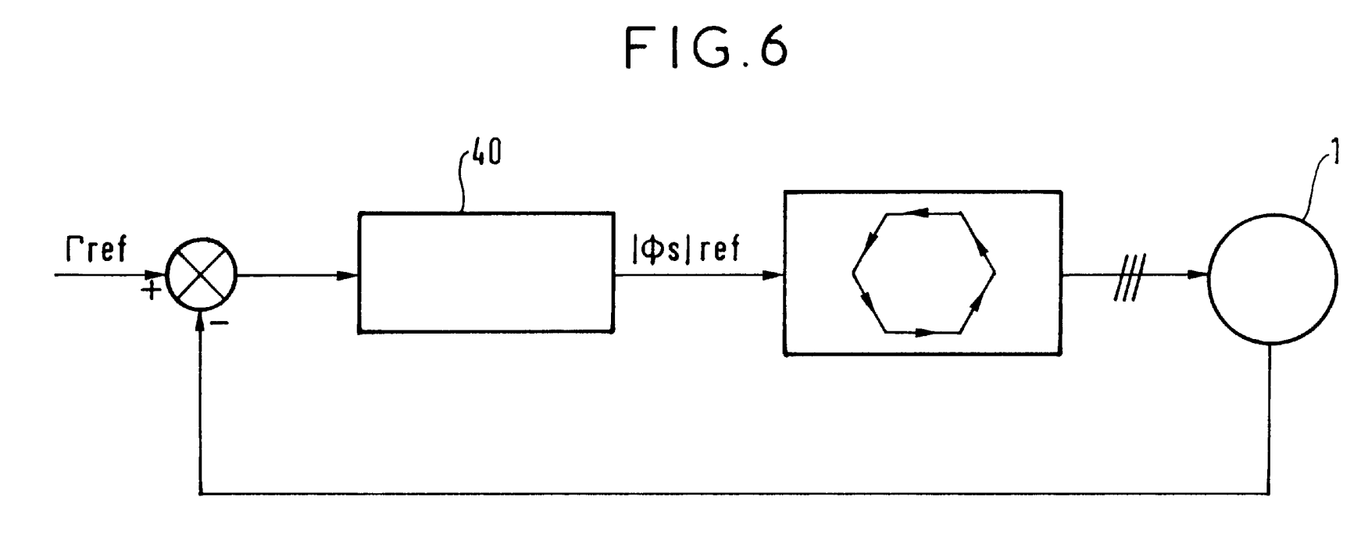
FIG. 6 is a schematic representation of a full wave mode correction example in accordance with the invention.

This latter feature makes it a simple matter to change from the synchronous control strategy to the full wave strategy. In a first stage the null state application time dt0 tends to zero, and then cancels. The system is then in the full wave mode.

The reader will understand that in the full wave mode the fact that the null state application time $dt_0$ is equal to zero means that it is no longer possible to control the torque directly. The torque of the rotating machine is then controlled by way of the flux, in accordance with the following rules:

To increase the torque $\Gamma$ angle between the stator flux and the rotor flux is increased. To achieve this the rotation of the stator flux vector is accelerated. This implies reducing the stator flux norm.

To reduce the torque $\Gamma$ the angle between the stator flux and the rotor flux is reduced. To achieve this the rotation speed of the stator flux vector is reduced. This implies increasing the stator flux norm.

This form of control is exercised by an applied stator flux corrector in accordance with the difference between the instantaneous torque and the set point torque.

The torque is regulated by the flux corrector as a function of $\Delta\Gamma = \Gamma_{ref} - \Gamma_c$ in accordance with the following rules:

For $\Delta\Gamma > 0$ the corrector decreases the stator flux norm.

For $\Delta\Gamma < 0$ the corrector increases the stator flux norm.

The invention also concerns a servocontrol system for implementing the process described hereinabove.

The invention finally concerns a rotating machine provided with a servocontrol system of the above kind.

Of course, the invention is not limited to the embodiment or application described, but is susceptible to many variants that will be evident to the skilled person and do not depart from the scope of the invention. In particular, the number of phases, the number of logic levels of each single pole, the calculation space and the calculation systems can be varied without departing from the scope of the invention.

What is claimed is:

1. A process for controlling a rotating machine including n phases supplied with alternating current by a voltage inverter comprising n SPmLL switches, wherein m comprises a number of levels represented by a single switch, said n SPmLL switches defining $m^n$ states of a stator phase voltage vector, wherein an electromagnetic torque $\Gamma$ and a stator flux $|\phi_s|$ of said rotating machine is slaved to set portions $\Gamma_{ref}$, $|\phi_s|_{ref}$ by a servocontrol system in accordance with various control strategies, each strategy of said various control strategies having application conditions, said servocontrol system including a set of sensors whose outputs are transmitted to a sampler for sampling at a sampling period $T_e$ to provide sampled values for the electromagnetic torque and the stator flux of said rotating machine, the sampled values being input to a calculator, said calculator outputting control signals for said SPmLL switches of said voltage inverter in accordance with said application conditions of the control strategy employed, said process for controlling said rotating machine comprising:

successively switching n states of said phase voltage vector to move said torque $\Gamma$ and said flux $|\phi_s|$ towards said set points $\Gamma_{ref}$, $|\phi_s|$ in succession in accordance with an application time where $dt_k$ where $k \in \{1, \ldots, n\}$ for applying each of said n states of said succession, said successive switching occurring on each sampling, calculating a remaining application time of a current state of said phase vector and calculating and an updated application time of future states of said phase vector, and synchronously with the sampling times and the calculation times, sending SPmLL switch control signals to switch from said current state to the next state to control the rotating machine at the end of the application time of said current state.

2. The control process claimed in claim 1, wherein said calculator performs calculations in an orthogonal three-dimension calculation frame of reference comprising a stator place ($\phi_{s\alpha}$, $\phi_{s\beta}$) of said stator flux $\phi_s$ and an axis perpendicular to said stator plane ($\phi_{s\alpha}$, $\phi_{s\beta}$) representing said torque $\Gamma$, wherein said set points $\Gamma_{ref}$, $|\phi_s|$ are represented by a circle $\eta_{ref}$ contained in a plane parallel to said stator plane ($\phi_{s\alpha}$, $\phi_{s\beta}$), centered on said perpendicular axis, having a radius $|\phi_s|_{ref}$ and intercepting said perpendicular axis at $\Gamma_{ref}$, wherein the values $\Gamma$, $\phi_s$ supplied by said rotating machine are represented by a point A ($\phi_{s\alpha}$, $\phi_{s\beta}$, $\Gamma$) on a circle $\eta$ contained in a plane parallel to said stater plane A ($\phi_{s\alpha}$, $\phi_{s\beta}$), centered on said perpendicular axis, having a radius $\phi_s$ and intercepting said perpendicular axis at $\Gamma$, and wherein said control strategy is a strategy asynchronous with a rotation frequency of said rotating machine, wherein said successively switching step further comprises calculating said succession of n states of said voltage vector so that said point A ($\phi_{s\alpha}$, $\phi_{s\beta}$, $\Gamma$) converges to any point D of a circle $\eta_{cal}$, centered on said perpendicular axis, having a radius $|\phi_s|_{cal}$ and intercepting said perpendicular axis at $\Gamma_{cal}$ by successive application of said n states, in a predetermined given time;

calculating the equation of said circle $\eta_{cal}$ so that the application times of said succession of phase vector voltages generates a mean torque $\Gamma$ and a mean stator flux that are respectively substantially equal to said set points $\Gamma_{ref}$, $|\phi_s|_{ref}$.

3. The control process claimed in claim 2 wherein n is equal to three, and said control strategy is based on a cycle comprising:

searching for a unique triplet of states ($V_0$, $V_i$, $V_{adj}$)$\in \{2 \ldots m^n - 1\}$ of said $m^n$ possible voltage vector states, said unique triplet succession constituting a succession of three states comprising an initial state $V_i$, one of the two states $V_{adj}$ adjacent to $V_i$ and a null state ($V_0$), and wherein respective application times $dt_i$, $dt_{adj}$, $dt_0$ of said unique triplet are positive and such that their sum is equal to half a switching period $T_d$ of said inverter.

4. The control process claimed in claim 3 wherein said step for searching for unique triplet comprises:

a) calculating a presumed arrival point D' on said circle $\eta_{cal}$, b) sending said SPmLL switch control signals to switch to said state $V_i$ based on said presumed arrival point, c) on each sampling, calculating for a current point A' ($\phi_{s\alpha c}$, $\phi_{s\beta c}$, $\Gamma_c$) a remaining time $dt_{ir}$ of application of said state $V_i$ and updated times $dt_{adj}$, and $dt_0$ of the future states $V_{adj}$ and $V_0$, then d) if $dt_{ir} \leq T_e$, predicting the switching time from said state $V_i$ to said state $V_{adj}$, then e) asynchronously with said sampling times and said calculation times, when said switching times arrives for switching from said state $V_i$ to said state $V_{adj}$, sending said SPmLL switch control signals to switch to said state $V_{adj}$, f) on each sampling, calculating for a current point B' ($\phi_{s\alpha c}$, $\phi_{s\beta c}$, $\theta_c$) a remaining time $dt_{adjr}$ of application of said state $V_{adj}$ and an updated time $dt_0$ of said future state $V_0$, g) if $dt_{adjr} \leq T_e$, predicting the switching time from said state $V_{adj}$ to said state $V_0$, then h) asynchronously with said sampling times and said calculation times, when said switching time arrives for switching from said state $V_{adj}$ to said state $V_0$, sending said SPmLL switch control signals to switch to said state $V_0$, then i) on each sampling, calculating for a current point C' ($\phi_{s\alpha c}$, $\phi_{s\beta c}$, $\Gamma_c$) a remaining time $dt_{or}$ of application of said state $V_0$, then j) if $dt_{0r} \leq T_e$, searching for a new unique triplet $(V'_0 V'_1, V'_{adj}) i \in \{2 \ldots m^n-1\}$ and predicting a switching time from said state $V_0$, to said state $V'_i$, then k) asynchronously with said sampling times and said calculation times, when said switching times arrives for switching from said state $V_0$ to said state $V'i$ sending said SPmLL control signals to switch to said state $V'_i$, then processing the new unique triplet $(V'_0, V'_i, V'_{adj})$ by applying steps c) through k) respectively for state $V'_0$, $V'_i$ and $V'_{adj}$.

5. The control process claimed in claim 4 wherein in step c) said calculating step comprises solving the following system to determine the remaining time $dt_{ir1}$ and updated times $dt_{adj}$ and $dt_0$:

$$\begin{vmatrix} \overset{\circ}{\phi}_{s\alpha}(V_i) & \overset{\circ}{\phi}_{s\alpha}(V_{adj}) & \overset{\circ}{\phi}_{s\alpha}(V_0) & \phi_{s\beta}(D') \\ \overset{\circ}{\phi}_{s\beta}(V_i) & \overset{\circ}{\phi}_{s\beta}(V_{adj}) & \overset{\circ}{\phi}_{s\beta}(V_0) & -\phi_{s\alpha}(D') \\ \overset{\circ}{\Gamma}(V_i) & \overset{\circ}{\Gamma}(V_{adj}) & \overset{\circ}{\Gamma}(V_0) & 0 \\ 1 & 1 & 1 & 0 \end{vmatrix} \begin{vmatrix} dt_{ir} \\ dt_{adj} \\ dt_0 \\ \lambda \end{vmatrix} = \begin{vmatrix} \phi_{s\alpha}(D) - \phi_{s\alpha}(A') \\ \phi_{s\beta}(D) - \phi_{s\beta}(A') \\ \Gamma(D) - \Gamma(A') \\ (1/2)T_d - t_c \end{vmatrix}$$

where $\lambda$ is a parameter defining the position of said point D on a tangent to said circle $\eta_{cal}$ at D', and where $(1/2)T_d - t_c$ is a time remaining before a new period $(1/2)T_d$ and in step f) said calculating step comprises solving the following system using the least squares method to determine the remaining application time $dt_{adj}$ and the updated time $dt_0$:

$$\begin{vmatrix} \overset{\circ}{\phi}_{s\alpha}(V_{adj}) & \overset{\circ}{\phi}_{s\alpha}(V_0) & \phi_{s\beta}(D') \\ \overset{\circ}{\phi}_{s\beta}(V_{adj}) & \overset{\circ}{\phi}_{s\beta}(V_0) & -\phi_{s\alpha}(D') \\ \overset{\circ}{\Gamma}(V_{adj}) & \overset{\circ}{\Gamma}(V_0) & 0 \\ 1 & 1 & 0 \end{vmatrix} \begin{vmatrix} dt_{adjr} \\ dt_0 \\ \lambda \end{vmatrix} = \begin{vmatrix} \phi_{s\alpha}(D) - \phi_{s\alpha}(B') \\ \phi_{s\beta}(D) - \phi_{s\beta}(B') \\ \Gamma(D) - \Gamma(B') \\ (1/2)T_d - t_c \end{vmatrix}$$

where $(1/2)T_d - t_c$ is a time remaining before a new period $(1/2)T_d$.

6. The process claimed in claim 4 wherein in step i), said calculating step comprises solving C' ($\phi_{s\alpha c}$, $\phi_{s\beta c}$, $\Gamma_c$) the remaining time $dt_{or}$ of application of state $V_0$ by using a least squares method to solve the following system:

$$\begin{vmatrix} \overset{\circ}{\Gamma}(V_0) \\ 1 \end{vmatrix} |dt_0| = \begin{vmatrix} \Gamma(D) - \Gamma(C') \\ (1/2)T_d - t_c \end{vmatrix}$$

where $(1/2)T_d - t_c$ is a time remaining before a new period $(1/2)T$.

7. The process claimed in claim 4 wherein in step d) said predicting step comprises switching from said state $V_i$ to another state adjacent to $V_i$ in order to re-align the trajectory of said point B' towards said circle $\eta_{cal}$.

8. The process claimed in claim 3, wherein if said searching step fails to identify a unique triplet $(V_0, V_i, V_{adj})$ that satisfies conditions for $dt_i$, $dt_{adj}$ and $dt_0$ and Td, said process comprises searching for a succession of two states $(V_i, V_{adj})$ other than a null state for a best approximation to said point A ($\phi_{s\alpha}$, $\phi_{s\beta}$, $\Gamma$) on said circle $\eta_{ref}$ in the time interval $(1/2)T_d$.

9. The control process claimed in claim 1, wherein said calculator performs calculations in an orthogonal three-dimensional calculation frame of reference comprising a stator plane ($\phi_{s\alpha}$, $\phi_{s\beta}$) of said stator flux $\phi_s$ and an axis perpendicular to said stator plane ($\phi_{s\alpha}$, $\phi_{s\beta}$) representing said torque $\Gamma$, wherein said set points $\Gamma_{ref}$, $|\phi_s|_{ref}$ are represented by circle $\eta_{ref}$ contained in a plane parallel to said stator plane ($\phi_{s\alpha}$, $\phi_{s\beta}$), centered on said perpendicular axis having a radium $|\phi_s|_{ref}$ and intercepting said perpendicular axis at $\Gamma_{ref}$, wherein the values $\Gamma$, $\phi_s$ supplied by said rotating machine are represented by a point A ($\phi_{s\alpha}$, $\phi_{s\beta}$, $\Gamma$), centered on said perpendicular axis, having a radius $|\phi_s|$ and intercepting said perpendicular axis at $\Gamma$, and wherein said control strategy synchronous with a rotation frequency of said rotating machine wherein said successively switching step further comprises calculating said succession of n states of said voltage vector so that said point A ($\phi_{s\alpha}$, $\phi_{s\beta}$, $\Gamma$) converges to a point D on a circle $\eta_{cal}$ centered on said perpendicular axis, having a radius $|\phi_s|_{cal}$ and intercepting said perpendicular axis at $\Gamma_{cal}$, by successive application of said n states, with a predetermined final position of said stator flux vector in said stator plane ($\phi_{s\alpha}$, $\phi_{s\beta}$);

calculating the equation of said circle $\eta_{cal}$ so that the application times of said succession of said phase vector voltages generates a mean torque $\Gamma$ and a mean stator flux $|\phi_s|$ that are respectively substantially equal to said set points $\Gamma_{ref}$, $|\phi_s|_{ref}$.

10. The control process claimed in claim 9 wherein a number of predetermined positions authorized for each rotation of said stator flux is finite and dependent on a range of rotation speed of said rotating machine.

11. The control process claimed in claim 9 wherein, n is equal to three, and said control strategy is such that a unique triplet of states $(V_0, V_i, V_{adj}) i \in \{2 \ldots m^n-1\}$ of said $m^n$ possible voltage vectors constitutes a succession of three states, comprising an initial state $V_i$, one of the two states $V_{adj}$ adjacent to $V_i$ and a null state ($V_0$), the respective application times $dt_i$, $dt_{adj}$, $dt_0$ of which are positive, said triplet intercepts said circle $\eta_{cal}$ at a known point D.

12. The control process claimed in claim 11 comprising a rotary machine initialization step, wherein triplets ($V_0$, $V_i$, $V_{adj}$)i∈{2...$m^n$-1} are stored in memory in said calculator for going from one predetermined position to another predetermined position of said stator flux vector, according to various rotating machine rotation speed ranges, said process further comprising:

applying a particular triplet ($V_0$, $V_i$, $V_{adj}$) according to the rotation speed of said rotating machine and the predetermined position at which said stator flux vector is located, b) sending said SPmLL switch control signals to switch to state $V_i$, c) on each sampling, calculating for a current point A' ($\phi_{s\alpha c}$, $\phi_{s\beta c}$, $\Gamma_c$) a remaining time $dt_{ir}$ of application of said state $V_i$ and updated times $dt_{\alpha dj}$ and $dt_0$ of said future state $V_{adj}$ and $V_0$, d) if $dt_{ir} \leq T_e$ predicting the time of switching from said state $V_i$ to state $V_{adj}$, e) asynchronously with said sampling times and said calculation times, when said switching time arrives to switch from state $V_i$ to state $V_{adj}$, sending said SPmLL switch control signals to switch to state $V_{adj}$, f) on each sampling, calculating for a current point B' ($\phi_{s\alpha c}$, $\phi_{s\beta c}$, $\Gamma_c$) a remaining time $dt_{adjr}$ of application of said state $V_{adj}$ and an updated time $dt_0$ of said future state $V_0$, g) if $dt_{adjr} \leq T_e$, predicting the time of switching from said state $V_{adj}$ to said state $V_0$, h) asynchronously with said sampling times and said calculation times, when said switching time arrives for switching between state $V_{adj}$ to state $V_0$, sending said SPmLL switch control signals to switch to said state $V_0$, j) if $dt_{0r} \leq T_e$, predicting the time of switching from said state $V_0$ to said state $V'_i$ and identifying the new unique triplet ($V'_0$, $V'_i$, $V'_{adj}$) for going from the predetermined position that is about to be reached to the next predetermined position of said stator flux vector, and k) asynchronously with said sampling times and said calculation times, when said switching time arrives to switch from state $V_0$ to state $V'_i$, sending said SPmLL switch control signals to switch to said state $V'_i$, and processing the new unique triplet ($V'_0$, $V'_i$, $V'_{adj}$) in accordance with steps c) through k) for respective values $V'_0$, $V'_i$ and $V'_{adj}$.

13. The control process claimed in claim 12 wherein in step c) said calculating step comprises solving the following system to determine the remaining time $dt_{ir}$ and updated times $dt_{adj}$ and $dt_0$:

$$\begin{vmatrix} \overset{\circ}{\phi}_{s\alpha}(V_i) & \overset{\circ}{\phi}_{s\alpha}(V_{adj}) & \overset{\circ}{\phi}_{s\alpha}(V_0) \\ \overset{\circ}{\phi}_{s\beta}(V_i) & \overset{\circ}{\phi}_{s\beta}(V_{adj}) & \overset{\circ}{\phi}_{s\beta}(V_0) \\ \overset{\circ}{\Gamma}(V_i) & \overset{\circ}{\Gamma}(V_{adj}) & 0 \end{vmatrix} \begin{vmatrix} dt_{ir} \\ dt_{adj} \\ dt_0 \end{vmatrix} = \begin{vmatrix} \phi_{s\alpha}(D) - \phi_{s\alpha}(A') \\ \phi_{s\beta}(D) - \phi_{s\beta}(A') \\ \Gamma(D) - \Gamma(A') \end{vmatrix}$$

and in step f) said calculating step comprises solving the following system to determine the remaining time $dt_{adjr}$ and the updated time $dt_0$:

$$\begin{vmatrix} \overset{\circ}{\phi}_{s\alpha}(V_{adj}) & \overset{\circ}{\phi}_{s\alpha}(V_0) & \overset{\circ}{\phi}_{s\beta}(D) \\ \overset{\circ}{\phi}_{s\beta}(V_{adj}) & \overset{\circ}{\phi}_{s\beta}(V_0) & \overset{\circ}{\phi}_{s\beta}(V_0) \\ \overset{\circ}{\Gamma}(V_{adj}) & \overset{\circ}{\Gamma}(V_0) & 0 \end{vmatrix} \begin{vmatrix} dt_{adjr} \\ dt_0 \\ \lambda \end{vmatrix} = \begin{vmatrix} -\phi_{s\alpha}(B') \\ -\phi_{s\beta}(B') \\ \Gamma(D) - \Gamma(B') \end{vmatrix}$$

where $\lambda$ is a parameter defining the predictable final position of the current point B' on a straight line in said stator plane passing through said torque $\Gamma$ axis and parallel to the predetermined position of said stator flux vector to be reached.

14. The process claimed in claim 12 wherein in step i) said calculating step comprises solving, for said current point C' ($\phi_{s\alpha c}$, $\phi_{s\beta c}$, $\Gamma_c$) the remaining time $dt_{0r}$ of application of said state $V_0$ by solving the following system:

$$\Gamma(D) = \Gamma(A) + [\Gamma_{ref} - \Gamma_{mean}]$$

$$dt_{0r} = \frac{\Gamma(D) - \Gamma(t_c)}{\overset{\circ}{\Gamma}(V_0)}$$

where $\Gamma_{mean}$ is the mean electromagnetic torque calculated over the time interval $dt_i + dt_{\alpha dj}$.

15. The process claimed in claim 11 wherein the time $dt_0$ of application of said null state is a decreasing function of said rotation speed of said rotating machine and equal to zero beyond a predetermined value of said rotation speed of said rotating machine.

16. The process claimed in claim 14 wherein if said time $dt_0$ of application of said null state is equal to zero the torque is controlled by a flux corrector as a function of $\Delta\Gamma = \Gamma_{ref} - \Gamma_c$ in accordance with the following rules:

for $\Delta\Gamma > 0$ said corrector decreases the stator flux norm;

for $\Delta\Gamma < 0$ said corrector increases the stator flux norm.

17. A control system operable to variably control a rotating machine according to application conditions including n phases supplied with alternating current by a voltage inverter comprising n SPmLL switches, wherein m comprises a number of levels represented by a single switch, said n SPmLL switches defining $m^n$ states of a stator phase voltage vector, wherein an electromagnetic torque $\Gamma$ and a stator flux $|\phi_s|$ of said rotating machine are slaved to set points $\Gamma_{ref}$, $|\phi_s|_{ref}$ by a servocontrol system that can employ various control strategies, each strategy having application conditions, said servocontrol system including:

a set of sensors;

an observer-sampler receiving inputs from the set of sensors;

a sampler receiving the outputs of said observer to sample the observer outputs at a given sampling time $T_e$ to provide sampled values;

said calculating device receiving the sampled values and said calculating device outputting control signals for said SPmLL switches of said voltage inverter, in accordance with said application conditions;

wherein said calculating device calculates a succession of n states of said phase voltage vector to move said torque $\Gamma$ and said flux $|\phi_s|$ towards said set points $\Gamma_{ref}$, $|\phi_s|_{ref}$ by successively switching said n states of said succession and an application time $dt_k$ where k ∈ {1, ... n} for applying each of said n states of said succession, wherein on each sampling, said calculating device calculates a remaining application time of a current state and updated application times of future states of said phase vector, and asynchronously with the sampling times and the calculating times, at the end of the application time of said current sate, said calculating device sends SPmLL switch control signals to switch from said current state to the next state.

18. The control system claimed in claim 17, wherein said calculating device performs calculations in an orthogonal three-dimensional calculation frame of reference comprising a stator plane ($\phi_{s\alpha}$, $\phi_{s\beta}$) of said stator flux $\phi_s$ and an axis perpendicular to said stator plane ($\phi_{s\alpha}$, $\phi_{s\beta}$) representing said torque $\Gamma$, wherein said set points $\Gamma_{ref}$ $|\phi_s|_{ref}$ are represented by a circle $\eta_{ref}$ contained in a plane parallel to said stator plane ($\phi_{s\alpha}$, $\phi_{s\beta}$), centered on said perpendicular axis, having a radius $|\phi_s|_{ref}$ and intercepting said perpendicular axis at $\Gamma_{ref}$, wherein the values $\Gamma$, $\phi_s$ supplied by the rotating machine are represented by a point A ($\phi_{s\alpha}$, $\phi_{s\beta}$, $\Gamma$) on a circle $\eta$ contained in a plane parallel to said stator plane ($\phi_{s\alpha}$, $\phi_{s\beta}$), centered on said perpendicular axis, having a radius $|\phi_s|$ and intercepting said perpendicular axis at $\Gamma$, and wherein said calculating device provides a control strategy which is asynchronous with a rotation frequency of the rotating machine and wherein said calculating device calculates said succession of n states of said voltage vector such that said point A ($\phi_{s\alpha}$, $\phi_{s\beta}$, $\Gamma$) converges to any point D of a circle $\eta_{cal}$, centered on said perpendicular axis, having a radius $|\phi_s|_{cal}$ and intercepting said perpendicular axis at $\Gamma_{cal}$ by successive application of said n states, in a predetermined given time;

said calculating device further calculates the equation of said circle $\eta_{cal}$ so that the application times of said succession of phase vector voltages generates a mean torque $\Gamma$ and a mean stator flux that are respectively substantially equal to said set points $\Gamma_{ref}$, $|\phi_s|_{ref}$.

19. The control system claimed in claim 18 wherein, n being equal to three, said control strategy is based on a cycle such that said calculating devices searches for a unique triplet of states ($V_0$, $V_i$, $V_{adj}$)$i \in \{2 \ldots m^n-1\}$ of said $m^n$ possible voltage vector states, said unique triplet consisting a succession of three states comprising an initial state $V_i$, one of the two states $V_{adj}$ adjacent to $V_i$ and a null state ($V_0$), and wherein respective application times $dt_i$, $dt_{adj}$, $dt_0$ of said unique triplet are positive and such that their sum is equal to half a switching period $T_d$ of said inverter.

20. The control system claimed in claim 19 wherein:
a) said calculating device searches for the unique triplet and calculates a presumed arrival point D' on said circle $\eta_{cal}$,
b) said calculating device sends said SPmLL switch control signals to switch to said state $V_i$ based on said presumed arrival point, then
c) on each sampling, said calculating device calculates for a current point A' ($\phi_{s\alpha c}$, $\phi_{s\beta c}$, $\Gamma_c$) a remaining time $dt_{ir}$ of application of said state $V_i$ and the updated times $dt_{adj}$ and $dt_0$ of the future states $V_{adj}$ and $V_0$,
d) said calculating device determines whether $dt_{ir} \leq T_e$ and if so, said calculating device predicts the switching time from said state $V_i$ to said state $V_{adj}$,
e) asynchronously with said sampling times and said calculation times, when said switching time arrives for switching from said state $V_i$ to said state $V_{adj}$, said calculating device sends said SPmLL switch control signals to switch to said state $V_{adj}$, f) on each sampling, said calculating device calculates for a current point B' ($\phi_{s\alpha c}$, $\phi_{s\beta c}$, $\Gamma_c$) a remaining time $dt_{adjr}$ of application of said state $V_{adj}$ and an updated time $dt_0$ of said future state $V_0$,
g) said calculating device determines whether $dt_{adjr} \leq T_e$ and if so, said calculating device predicts the switching time from said state $V_{adj}$ to said state $V_0$, then
h) asynchronously with said sampling times and said calculation times, when said switching time arrives for switching from said state $V_{adj}$ to said state $V_0$, said calculating device sends said SPmLL switch control signals to switch to said state $V_0$, then,
i) on each sampling, said calculating device calculates for a current point C' ($\phi_{s\alpha c}$, $\phi_{s\beta c}$, $\Gamma_c$) a remaining time $dt_{0r}$ of application of said state $V_0$,
j) said calculating device determines whether $dt_{0r} \leq T_e$ and if so, said calculating device searches for a new unique triplet (V'$_0$, V'$_i$, V'$_{adj}$)$i \in \{2 \ldots m^n-1\}$ and predicts a switching time from said state $V_0$ to said state V'$_i$, then
k) asynchronously with said sampling times and said calculation times, when said switching time arrives for switching from said state $V_0$ to said state V'$_i$, said calculating device sends said SPmLL control signals to switch to said state V'$_i$, then said calculating device processes the new triplet (V'$_0$, V'$_i$, V'$_{adj}$) according to features c) through k) on values V'$_0$, V'$_i$, V'$_{adj}$.

21. The control system claimed in claim 20, wherein in item c) said calculating device solves the following system to determine the remaining time $dt_{ir}$, and the updated times $dt_{adhr}$ and the updated time $dt_0$:

$$\begin{vmatrix} \overset{\circ}{\phi}_{s\alpha}(V_i) & \overset{\circ}{\phi}_{s\alpha}(V_{adj}) & \overset{\circ}{\phi}_{s\alpha}(V_0) & \phi_{s\beta}(D') \\ \overset{\circ}{\phi}_{s\beta}(V_i) & \overset{\circ}{\phi}_{s\beta}(V_{adj}) & \overset{\circ}{\phi}_{s\beta}(V_0) & -\phi_{s\alpha}(D') \\ \overset{\circ}{\Gamma}(V_i) & \overset{\circ}{\Gamma}(V_{adj}) & \overset{\circ}{\Gamma}(V_0) & 0 \\ 1 & 1 & 1 & 0 \end{vmatrix} \begin{vmatrix} dt_{ir} \\ dt_{adj} \\ dt_0 \\ \lambda \end{vmatrix} = \begin{vmatrix} \phi_{s\alpha}(D) - \phi_{s\alpha}(A') \\ \phi_{s\beta}(D) - \phi_{s\beta}(A') \\ \Gamma(D) - \Gamma(A') \\ (1/2)T_d - t_c \end{vmatrix}$$

where $\lambda$ is a parameter defining the position of said point D on a tangent to said circle $\eta_{cal}$ at D', where $(1/2)T_d-t_c$ is a time remaining before a new period $(1/2)T_d$ and in item f) said calculating device solves the following system using the least squares method to determine the remaining time $dt_{adj}$ and the updated time $dt_0$;

$$\begin{vmatrix} \overset{\circ}{\phi}_{s\alpha}(V_{adj}) & \overset{\circ}{\phi}_{s\alpha}(V_0) & \phi_{s\beta}(D') \\ \overset{\circ}{\phi}_{s\beta}(V_{adj}) & \overset{\circ}{\phi}_{s\beta}(V_0) & -\phi_{s\alpha}(D') \\ \overset{\circ}{\Gamma}(V_{adj}) & \overset{\circ}{\Gamma}(V_0) & 0 \\ 1 & 1 & 0 \end{vmatrix} \begin{vmatrix} dt_{adjr} \\ dt_0 \\ \lambda \end{vmatrix} = \begin{vmatrix} \phi_{s\alpha}(D) - \phi_{s\alpha}(B') \\ \phi_{s\beta}(D) - \phi_{s\beta}(B') \\ \Gamma(D) - \Gamma(B') \\ (1/2)T_d - t_c \end{vmatrix}$$

22. The system claimed in claim 20, wherein in item i) said calculating device calculates for said current point C' ($\phi_{s\alpha c}$, $\phi_{s\beta c}$, $\Gamma_c$) the remaining time $dt_{0r}$ of application of said state $V_0$ by using a least squares method to solve the following system:

$$\begin{vmatrix} \overset{\circ}{\Gamma}(V_0) \\ 1 \end{vmatrix} |dt_0| = \begin{vmatrix} \Gamma(D) - \Gamma(C') \\ (1/2)T_d - t_c \end{vmatrix}.$$

where $(1/2)T_d-t_c$ is time remaining before a new period $(1/2)T_d$.

23. The system claimed in claim 20 wherein in said calculating device predicts the switching from said state $V_i$ in order to re-align the trajectory of said point B' towards said circle $\eta_{cal}$.

24. The system claimed in claim 20, wherein if said calculating device fails to find a unique triplet $(V_0, V_i, V_{adj})$ said calculating device looks for a succession of two states $(V_i, V_{adj})$ other than a null state for a best approximation to said point A $(\phi_{s\alpha}, \phi_{s\beta}, \Gamma)$ on said circle $\eta_{ref}$ in the time interval $(\frac{1}{2})T_d$.

25. The control system claimed in claim 17, wherein said calculator performs calculations in an orthogonal three-dimensional calculation frame of reference comprising a stator plane $(\phi_{s\alpha}, \phi_{s\beta})$ of said stator flux $\phi_s$ and an axis perpendicular to said stator plane $(\phi_{s\alpha}, \phi_{s\beta})$ representing said torque $\Gamma$, wherein said set points $\Gamma_{ref}$, $|\phi_s|_{ref}$ are represented by a circle $\eta_{ref}$ contained in a plane parallel to said stator plane $(\phi_{s\alpha}, \phi_{s\beta})$, centered on said perpendicular axis, having a radius $|\phi_s|_{ref}$ and intercepting said perpendicular axis at $\Gamma_{ref}$, wherein the values $\Gamma$, $\phi_s$ supplied by the rotating machine are represented by a point A $(\phi_{s\alpha}, \phi_{s\beta}, \Gamma)$ on a circle $\eta$ contained in a plane parallel to said stator plane $(\phi_{s\alpha}, \phi_{s\beta})$, centered on said perpendicular axis, having a radius $|\phi_s|$ and intercepting said perpendicular axis at $\Gamma$, and wherein said calculating device provides a control strategy which is synchronous with a rotation frequency of the rotating machine and wherein said calculating device calculates a succession of n states of said voltage vector so that said point A $(\phi_{s\alpha}, \phi_{s\beta}, \Gamma)$ converges to a point D on a circle $\eta_{cal}$ centered on said perpendicular axis, having a radius $|\phi_s|_{cal}$ and intercepting said perpendicular axis at $\Gamma_{cal}$, by successive application of said n states, with a predetermined final position of said stator flux vector in said stator plane $(\phi_{s\alpha}, \phi_{s\beta})$;

said calculating device further calculating the equation of said circle $\eta_{cal}$ so that the application times of said succession of said phase vector voltage generates a mean torque $\Gamma$ and a mean stator flux $|\phi_s|$ that are respectively substantially equal to said set points $\Gamma_{ref}$, $|\phi_s|_{ref}$.

26. The control system claimed in claim 25 wherein a number of predetermined positions authorized for each rotation of said stator flux is finite and dependent on a range of rotation speed of the rotating machine.

27. The control system claimed in claim 25 wherein n is equal to three, and said control strategy is such that said calculating device sets a unique triplet of states $(V_0, V_i, V_{adj})$ i$\in\{2...m^n-1\}$ of said voltage vector constituting a succession of three states, comprising an initial state $V_i$, one of the two states $V_{adj}$ adjacent to $V_i$ and a null state $(V_0)$, the respective application times $dt_i$, $dt_{adj}$, $dt_0$ of which are negative, said triplet intercepting said circle $\eta_{cal}$ at a known point D.

28. The control system of claim 27 further including a memory wherein, triplets $(V_0, V_i, V_{adj})$i$\in\{2...m^n-1\}$ are stored in said memory and in operation, a) said calculating device sets the triplet $(V_0, V_i, V_{adj})$ to be applied according to the rotation speed of said rotating machine and the predetermined position at which said stator flux vector is located, b) said calculating device sends said SPmLL switch control signals to switch to state $V_i$, c) on each sampling, said calculating device calculates for a current point A' $(\phi_{s\alpha c}, \phi_{s\beta c}, \Gamma_c)$ a remaining time $dt_{ir}$ of application of said state $V_i$ and updated times $dt_{adj}$ and $dt_0$ of said future states $V_{adj}$ and $V_0$, d) said calculating device determines whether $dt_{ir} \leq T_e$ and if so, said calculating device predicts the time of switching from said state $V_i$ to state $V_{adj}$, e) asynchronously with said sampling times and said calculation times, when said switching time arrives to switch from said state $V_i$ to said state $V_{adj}$, said calculating device sends said SPmLL switch control signals to switch to state $V_{adj}$, f) on each sampling, calculating device calculates for a current point B' $(\phi_{s\alpha c}, \phi_{s\beta c}, \Gamma_c)$ a remaining time $dt_{adjr}$ of application of said state $V_{adj}$ and an updated time $dt_0$ of said future state $V_0$, g) said calculating device determines whether $dt_{adjr} \leq T_e$, and if so, said calculating device predicts the time of switching from said state $V_{adj}$ to said state $V_0$, h) asynchronously with said sampling times and said calculation times, when said switching time arrives to switch from said state $V_{adj}$ to state $V_0$, said calculating device sends said SPmLL switch control signals to switch to said state $V_0$, i) on each sampling said calculating device calculates for a current point C' $(\phi_{s\alpha c}, \phi_{s\beta c}, \Gamma_c)$ a remaining time $dt_{0r}$ of application of said state $V_0$, j) said calculating device determines whether $dt_{0r} \leq T_e$, and if so, said calculating device predicts the time of switching from said state $V_0$ to said state $V'_i$ and additionally said calculating device sets a new unique triplet $(V'_0, V'_i, V'_{adj})$ for going from the predetermined position that is about to be reached to the next predetermined position of said stator flux vector, and k) asynchronously with said sampling times and said calculation times, when said switching time arrives for switching from state $V_0$ to state $V'_i$, said calculating device sends said SPmLL control signals to switch to said state $V'_i$, said calculating device processing the new unique triplet $(V'_0, V'_i, V'_{adj})$ in accordance with features c) through k) for $V'_0, V'_i, V'_{adj}$.

29. The control system claimed in claim 28 wherein in item c) said calculating device solves the following system to determine the remaining time $dt_{ir}$ and the updated times $dt_{dj}$ and $dt_0$:

$$\begin{vmatrix} \overset{\circ}{\phi}_{s\alpha}(V_i) & \overset{\circ}{\phi}_{s\alpha}(V_{adj}) & \overset{\circ}{\phi}_{s\alpha}(V_0) \\ \overset{\circ}{\phi}_{s\beta}(V_i) & \overset{\circ}{\phi}_{s\beta}(V_{adj}) & \overset{\circ}{\phi}_{s\beta}(V_0) \\ \overset{\circ}{\Gamma}(V_i) & \overset{\circ}{\Gamma}(V_{adj}) & \overset{\circ}{\Gamma}(V_0) \end{vmatrix} \begin{vmatrix} dt_{ir} \\ dt_{adj} \\ dt_0 \end{vmatrix} = \begin{vmatrix} \phi_{s\alpha}(D) - \phi_{s\alpha}(A') \\ \phi_{s\beta}(D) - \phi_{s\beta}(A') \\ \Gamma(D) - \Gamma(A') \end{vmatrix}$$

and in item f) said calculating device solves the following system to determine the remaining time $dt_{adj}$ and the updated time $dt_0$:

$$\begin{vmatrix} \overset{\circ}{\phi}_{s\alpha}(V_{adj}) & \overset{\circ}{\phi}_{s\alpha}(V_0) & \overset{\circ}{\phi}_{s\beta}(D) \\ \overset{\circ}{\phi}_{s\beta}(V_{adj}) & \overset{\circ}{\phi}_{s\beta}(V_0) & \overset{\circ}{\phi}_{s\beta}(V_0) \\ \overset{\circ}{\Gamma}(V_{adj}) & \overset{\circ}{\Gamma}(V_0) & 0 \end{vmatrix} \begin{vmatrix} dt_{adjr} \\ dt_0 \\ \lambda \end{vmatrix} = \begin{vmatrix} -\phi_{s\alpha}(B') \\ -\phi_{s\beta}(B') \\ \Gamma(D) - \Gamma(B') \end{vmatrix}$$

where $\lambda$ is a parameter defining the predictable final position of the current point B' on a straight line in said stator plane passing through said torque $\Gamma$ axis and parallel to the predetermined position of said stator flux vector to be reached.

30. The system claimed in claim 28 wherein in item i) said calculating device calculates for said current point C' ($\phi_{s\alpha c}$, $\phi_{s\beta}c$, $\Gamma$) the remaining time $dt_{0r}$ of application of said state $V_0$ by solving the following system:

$$\Gamma(D) = \Gamma(A) + [\Gamma_{ref} - \Gamma_{mean}]$$
$$dt_{0r} = \frac{\Gamma(D) - \Gamma(t_c)}{\overset{\circ}{\Gamma}(V_0)}$$

where $\Gamma_{mean}$ is the mean electromagnetic torque calculated over the time interval $dt_i + dt_{adj}$.

31. The system claimed in claim 27 wherein the time $dt_0$ of application of said null state is a decreasing function of said rotation speed of said rotating machine and equal to zero beyond a predetermined value of said rotation speed of said rotating machine.

32. The system claimed in claim 31 wherein if said time $dt_0$ of application of said null state is equal to zero the torque is controlled by a flux corrector as a function of $\Delta\Gamma = \Gamma_{ref} - \Gamma_c$ in accordance with the following rules:

for $\Delta\Gamma > 0$ said corrector decreases the stator flux norm;
for $\Delta\Gamma < 0$ said corrector increases the stator flux norm.

33. The system of claim 18 including a rotating machine providing inputs to said set of sensors and connected to said SPmLL switches, wherein said rotating machine has a torque and stator flux adjusted according to the control signals calculated by the calculating device.

34. The system of claim 20 including a rotating machine providing inputs to said set of sensors and connected to said SPmLL switches, wherein said rotating machine has a torque and stator flux adjusted according to the control signals calculated by the calculating device.

35. The system of claim 25 including a rotating machine providing inputs to said set of sensors and connected to said SPmLL switches, wherein said rotating machine has a torque and stator flux adjusted according to the control signals calculated by the calculating device.

36. The system of claim 28 including a rotating machine providing inputs to said set of sensors and connected to said SPmLL switches, wherein said rotating machine has a torque and stator flux adjusted according to the control signals calculated by the calculating device.

* * * * *